(12) United States Patent
Monty et al.

(10) Patent No.: US 11,976,999 B2
(45) Date of Patent: May 7, 2024

(54) CHAIN MONITORING SYSTEMS AND METHODS

(71) Applicant: U.S. Tsubaki Holdings, Inc., Wheeling, IL (US)

(72) Inventors: Charles R. Monty, North Granby, CT (US); Brian Leduc, Belchertown, MA (US); Paul Gorman, Longmeadow, MA (US); Robert J. Hogan, Ludlow, MA (US); Michael C. Hogan, Ludlow, MA (US); Daniel Harris, Chicopee, MA (US); Joseph Audette, Belchertown, MA (US)

(73) Assignee: U.S. Tsubaki Holdings, Inc., Wheeling, IL (US)

( * ) Notice: Subject to any disclaimer, the term of this patent is extended or adjusted under 35 U.S.C. 154(b) by 0 days.

(21) Appl. No.: 17/355,402

(22) Filed: Jun. 23, 2021

(65) Prior Publication Data

US 2022/0003636 A1  Jan. 6, 2022

Related U.S. Application Data

(60) Provisional application No. 63/047,564, filed on Jul. 2, 2020.

(51) Int. Cl.
*G01M 13/023* (2019.01)
*G01B 7/04* (2006.01)
*G01B 7/16* (2006.01)

(52) U.S. Cl.
CPC ........... *G01M 13/023* (2013.01); *G01B 7/046* (2013.01); *G01B 7/16* (2013.01)

(58) Field of Classification Search
CPC ....... G01M 13/023; G01B 7/046; G01B 7/16; G01B 21/16; G01B 21/32
See application file for complete search history.

(56) References Cited

U.S. PATENT DOCUMENTS

| 7,540,374 B2 | 6/2009 | Rathbun et al. |
| 10,125,699 B2 | 11/2018 | Wightman et al. |

(Continued)

FOREIGN PATENT DOCUMENTS

| GB | 2041549 A | * | 9/1980 | ............. G01L 5/101 |
| GB | 237918 A | | 1/2003 | |
| GB | 2400090 A | | 10/2004 | |

OTHER PUBLICATIONS

Int'l Search Report and Written Opinion Appln No. PCT/US2021/039369 dated Oct. 4, 2021.

(Continued)

*Primary Examiner* — Peter J Macchiarolo
*Assistant Examiner* — John M Royston
(74) *Attorney, Agent, or Firm* — McAndrews, Held & Malloy, Ltd.

(57) ABSTRACT

The present disclosure relates to chain monitoring systems and methods. In particular, the chain monitoring system is configured to mount onto a portion of a chain and measure one or more parameters associated with one or more characteristics of the chain. The measured parameters are processed by the chain monitoring system and/or transmitted to a remote system for analysis. The analysis may be used to determine a characteristic and/or change in the characteristic of the chain. In some examples, the characteristic is an elongation value associated with the chain, which can be transmitted to a networked system for analysis, display, and/or control. In some examples, a sensor can be employed to measure one or more characteristics of the chain. The sensor may include, but is not limited to, a strain gauge, an accelerometer, an optical, a sonic, and/or a magnetic sensor.

16 Claims, 16 Drawing Sheets

(56) References Cited

U.S. PATENT DOCUMENTS

| | | | |
|---|---|---|---|
| 2010/0005899 A1* | 1/2010 | Lodge | G01M 13/023 |
| | | | 73/828 |
| 2015/0226582 A1 | 8/2015 | Siraky et al. | |
| 2016/0116356 A1 | 4/2016 | Goldstein | |
| 2019/0086239 A1* | 3/2019 | Kreisfeld | G01B 7/24 |

OTHER PUBLICATIONS

Int'l Preliminary Report on Patentability Appln No. PCT/US2021/039369 dated Jan. 12, 2023.

* cited by examiner

Roller Chain Wear-Life Guide
(Thresholds User Selctable)
| Wear Elongation | Status | Action |
|---|---|---|
| 0-1.5% | Good | Monitor |
| 1.50% | Caution | Near End of Life |
| >2% | Warning | Replace |
FIG. 6
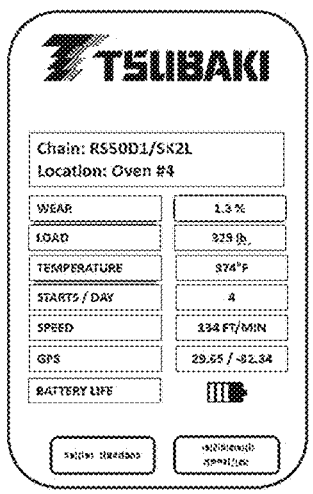
FIG. 7A
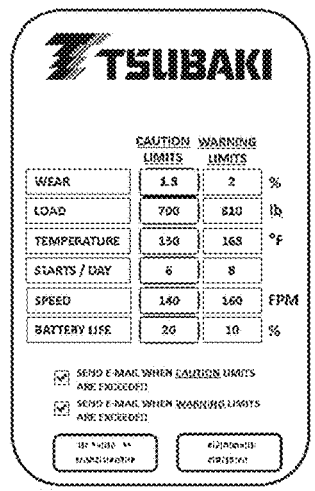
FIG. 7B
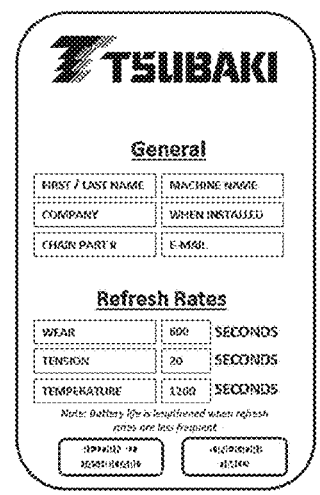
FIG. 7C

CHAIN MONITORING SYSTEMS AND METHODS

CROSS REFERENCE TO RELATED APPLICATIONS

This application is a Non-Provisional Patent Application claiming priority to and the benefit of U.S. Provisional Patent Application No. 63/047,564 entitled "Chain Monitoring Systems And Methods" filed Jul. 2, 2020, which is herein incorporated by reference in its entirety.

BACKGROUND

Roller chains may be used in a variety of industrial applications to, for example, transfer power. Movement of the chain and interaction with associated machinery can create uneven loads and forces that cause strain to the chain. Analyzing and determining the nature and/or scope of wear on the chain can be difficult, which can cause delays in providing maintenance to a chain and/or associated machinery.

In some examples, a chain experiences wear during operation, and elongation is associated with normal wear over time. When wear becomes excessive, the chain may experience degraded and/or improper performance, such that interfacing with associated sprockets is unreliable and subject to slippage. Thus, information regarding chain wear elongation which can aid in determining the appropriate time to service and/or replace the chain, ensuring proper maintenance and equipment function.

Some systems have employed one or more sensors to inform analysis of the wear experienced by the chain. However, remote sensors may not provide accurate and/or timely measurements needed for complete analysis. Thus, a need exists for a chain monitoring system that provides accurate and timely information regarding chain operation and wear status, load experiences, temperature during operation, speed, and/or other characteristics of the chain and/or operation thereof.

SUMMARY

The present disclosure relates to chain monitoring systems and methods. In particular, the chain monitoring system is configured to mount onto a portion of a chain and measure one or more parameters associated with one or more characteristics of the chain. The measured parameters are processed by the chain monitoring system and/or transmitted to a remote system for analysis. The analysis may be used to determine a characteristic and/or change in the characteristic of the chain. In some examples, the characteristic is an elongation value associated with the chain, which can be transmitted to a networked system for analysis, display, and/or control. In some examples, a sensor can be employed to measure one or more characteristics of the chain. The sensor may include, but is not limited to, a strain gauge to measure load on the chain, an accelerometer to provide input to measure speed of the chain, and/or a magnetic sensor arranged with the chain monitoring system to measure a magnetic field from a magnetic source to indicate elongation of the chain.

Other features and aspects of the invention will become apparent by consideration of the following detailed description and accompanying drawings.

BRIEF DESCRIPTION OF THE DRAWINGS

FIG. 6 illustrates an example roller chain wear-life guide for a chain monitoring system, in accordance with aspects of this disclosure.

FIGS. 7A-7C illustrate an example user interface for a chain monitoring system, in accordance with aspects of this disclosure.

Figure 1A:
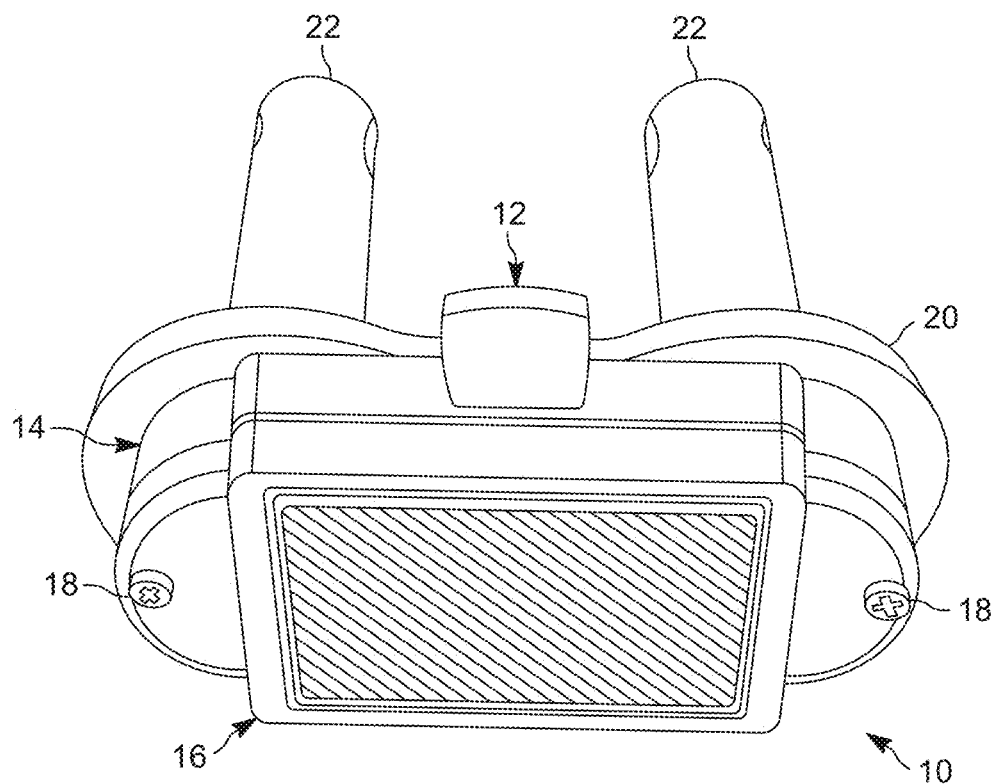
FIGS. 1A and 1B illustrate an example chain monitoring system, in accordance with aspects of this disclosure.

The figures are not necessarily to scale. Where appropriate, similar or identical reference numbers are used to refer to similar or identical components. It is understood that the present disclosure is not limited to any particular application or example, or to details and/or arrangement of components disclosed herein.

DETAILED DESCRIPTION

The present disclosure relates to chain monitoring systems and methods. In particular, the disclosure relates to chains used in power transmission and motion control products, including chains for lifting and/or conveyance applications.

The present disclosure provides a chain monitoring system configured to mount onto a portion of a chain, and measure (e.g., via one or more sensors) one or more parameters (e.g., temperature, speed, location, force, time in service, movement, shock, etc.) associated with a characteristic of the chain (e.g., wear, elongation, duty cycle, service time remaining, impact, etc.). The chain monitoring system may be housed in an enclosure, which may contain one or more boards (e.g., a printed circuit board (PCB)) with one or more components (e.g., sensors, processors, interfaces, transceivers, energy storage device, memory storage device, etc.) mounted thereon and/or electrically connected thereto.

The disclosed chain monitoring system is configured to measure, detect, transmit and/or receive information or data corresponding to one or more variables, such as one or more characteristics of an associated chain and/or a parameter associated with one or more characteristics of an associated chain. For example, the components may include, but are not limited to, one or more sensors (e.g., a strain gauge, a temperature sensor, an accelerometer, a magnetometer, etc.), one or more signal generators, one or more transceivers (or a transmitter and/or receiver), one or more energy storage devices, a location sensor (e.g., a GPS enabled device), and/or one or more processors (e.g., one or more control circuits, memory circuits, etc.).

The chain monitoring system employs one or more of the components to measure parameters, which can be analyzed to determine a characteristic of the associated chain, such as distance traveled and/or elongation the chain. For example, a chain may have an elongation tolerance between 2-3%, after which the chain should be serviced and/or replaced.

The chain monitoring system may be in wireless communication (e.g., via a Bluetooth protocol) with a remote device (e.g., a computing platform including a general-purpose computer, a portable smart device, etc.). The remote device may provide additional processing capabilities, including logging sensor information, analyzing such information, and/or controlling associated machinery.

The chain monitoring system may be mounted to one or more links of a chain. The mounting mechanism may include one or more fasteners (e.g., a screw, adhesives, snap-on fixtures, etc.).

Advantageously, the disclosed chain monitoring system is applicable to a variety of roller chain types (e.g., including RS40-RS240) and/or other types of chain, including but not limited to conveyor chain, large class engineering-type chain, plastic chain, etc. The chain monitoring system is designed to have the durability to operate over multiple chain cycles, with ease of transmission and infrequent need for battery recharging or replacement. In some disclosed examples, the battery is recharged via kinetic energy generation in response to movement of the chain, and/or alternative self-charging techniques and/or systems.

In disclosed examples, a chain monitoring system includes an enclosure to contain one or more components, a surface of the enclosure to mate with a link to mount the system onto a chain; one or more sensors to measure one or more parameters corresponding to chain wear; and a processing circuitry to: receive measurements from the one or more sensors; compare the measurements to one or more corresponding threshold values; calculate a wear value of the chain based on the measurements comparison; compare the wear value to a list of wear statuses; and determine a wear status of the chain based on the wear value comparison, and present the wear status on a user interface.

In some examples, the processing circuitry is further configured to assign a weighted factor to one or more of the measurements from the one or more sensors. In examples, the weighted factor is assigned before or after the measurements comparison. In examples, the processing circuitry is further configured to receive measurements from the one or more sensors at predetermined intervals. In examples, the processing circuitry is further configured to: identify measurements that exceed the one or more corresponding threshold values within a predetermined interval; apply a filter to the identified measurements; determine an identified measurement lies outside a range of acceptable averaging values; and generate an alert corresponding to each identified measurement that remains following application of the filter. In some examples, the filter is an averaging function applied over the predetermined interval or a plurality of predetermined intervals.

In some examples, the one or more sensors is a thermistor, a strain gauge, an inertial measurement unit, or a magnetic sensor. In examples, the one or more parameters include a temperature, time in service, speed, or load of the chain. In some examples, the processing circuitry is arranged in a remote computing platform, the remote computing platform configured to provide additional processing capabilities, log sensor information, analyze information, transmit or display alerts, or control machinery associated with the chain.

In some disclosed examples, a chain monitoring system comprises: an enclosure to contain one or more components, a surface of the enclosure to mate with a link to mount the system onto a chain; one or more sensors to measure one or more parameters corresponding to chain elongation; and a processing circuitry to: receive measurements from the one or more sensors; determine an elongation value of the chain based on the received measurements; and transmit the elongation value to a remote system for analysis, display, or control.

In some examples, the one or more sensors is a thermistor, a strain gauge, an inertial measurement unit, or a magnetic sensor. In some examples, the remote system comprises a user interface to provide customization tools for setting monitoring commands. In examples, the processing circuitry is further configured to: determine a maximum threshold elongation value; calculate a threshold operating elongation value below the maximum threshold value; compare the elongation value to the threshold operating value; and generate an alert in response to the elongation value exceeding the threshold operating elongation value.

In some examples, the processing circuitry is further configured to: receive measurements from the one or more sensors; calculate a change or a rate of change of one or more variables measured by the one or more sensors, wherein the variables correspond to one or more of load, temperature, wear, elongation, or time; compare the calculated change or rate of change to a list of threshold changes or rates of change of the one or more variables; and generate an alert in response to the calculated change or rate of change violating a threshold of the list of threshold changes or rates of change.

In some examples, the processing circuitry is further configured to receive measurements from the one or more sensors at predetermined intervals. In examples, the processing circuitry is further configured to transmit measurements from the one or more sensors at predetermined intervals. In some examples, the processing circuitry is further configured to assign a weighted factor to one or more of the measurements from the one or more sensors.

In examples, the enclosure is secured to the link via one or more of an adhesive, a fastener, or a snap-fit fixture. In some examples, an alert indicator configured to illuminate when a measured parameter exceeds a threshold value.

In some disclosed examples, a chain monitoring system comprises: an enclosure to contain one or more components, a surface of the enclosure to mate with a link to mount the system onto a chain; a magnetic sensor to measure a magnetic field from a magnetic source; and a processing circuitry to: receive magnetic field measurements from the magnetic sensor; determine an elongation value of the chain based on the received magnetic field measurements; and transmit the elongation value to a remote system for analysis, display, or control.

In some examples, the magnetic source is arranged on a portion of the chain a non-zero distance from the magnetic sensor. In some examples, the processing circuitry is further configured to: determine an elongation status for the chain, including a maximum threshold value; calculate a threshold operating elongation value below the maximum threshold value; compare the elongation value to the threshold operating value; and generate an alert in response to the elongation value exceeding the threshold operating elongation value.

As used herein, the terms "first" and "second" may be used to enumerate different components or elements of the same type, and do not necessarily imply any particular order.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller.

As used herein, the term "memory" or "memory storage device" includes volatile and non-volatile memory devices and/or other storage device.

Figure 1B:
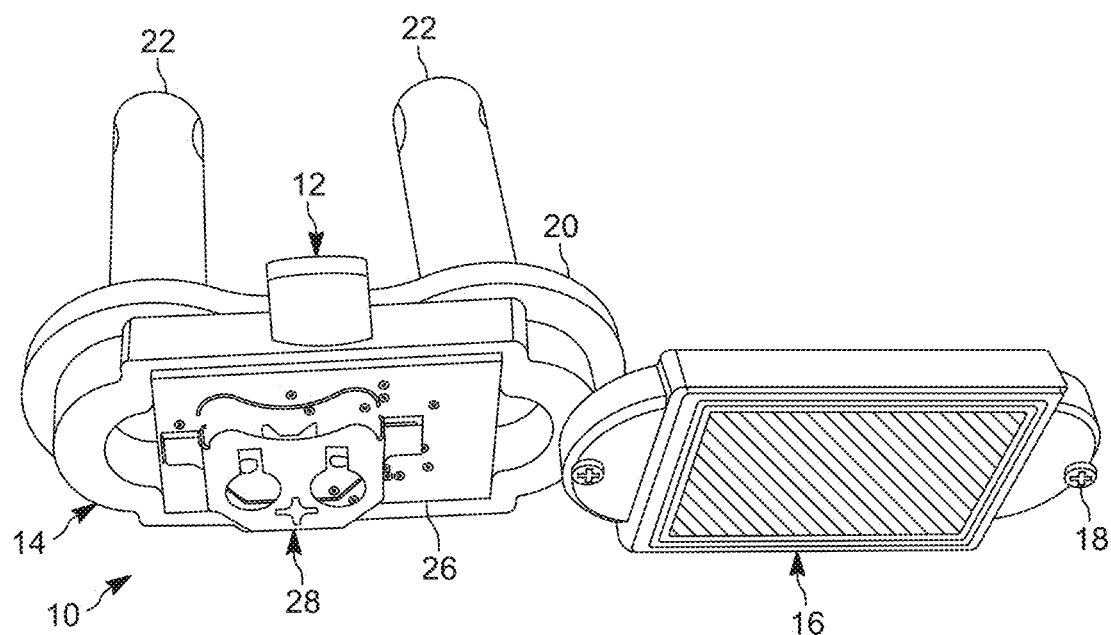

FIGS. 1A and 1B illustrate an example chain monitoring system 10, which includes one or more of a mounting mechanism 12, a body 14, a cover 16, and one or more fasteners 18. As shown, system 10 is mounted on a plate 20 (e.g., an external plate for a transmission chain) by use of mounting device 12, such as a snap-fit fastener to removably fix the system 10 to the plate 20. Additionally or alternatively, the system 10 may be mounted to chain via one or more of one or more fasteners screwed into the plate 20, adhesives, solder and/or weld to bond the system 10 to the plate 20, via one or more pins 22 mounted to the plate 20, and/or secured via a strap around a waist of the plate 20, to name a few non-limiting examples.

FIG. 1B shows the example system 10 with the cover 16 opened to reveal the contents within the body 14. As shown in FIG. 1B, the example system 10 includes a printed circuit board (PCB) 26, comprising one or more components 28 (described in greater detail with respect to FIG. 3). For example, the components 28 may include one more sensors to measure a parameter associated with a characteristic of the associated chain (e.g., the load applied to the chain). Although illustrated with a removable cover 16, in some examples the cover 16 is fixed, such that the system 10 is entirely enclosed. In either configuration, the mounted system 10 can be sealed in a closed configuration such that the PCB 26 and components 28 are free of moisture and/or environmental contaminants.

In some examples, sensors including a strain gauge and/or an accelerometer may measure forces on the chain, a temperature gauge may measure heat, one or more location sensors may be used to identify the location of the chain (e.g., within a particular machine and/or geographically), to name a few non-limiting examples. Processing circuitry can be employed to process information from the sensors, and a transceiver can send and/or receive information to and/or from a networked device (e.g., a remote computing platform, a linked sensor, etc.). In some examples, the information may be stored, processed, and analyzed in the system 10 circuitry before transmission to the networked device. Additionally or alternatively, the information may be transmitted directly to the networked device without processing at the system 10. Once processed, the information can be used to determine the condition of the chain and whether maintenance and/or replacement is needed.

Figure 2A:
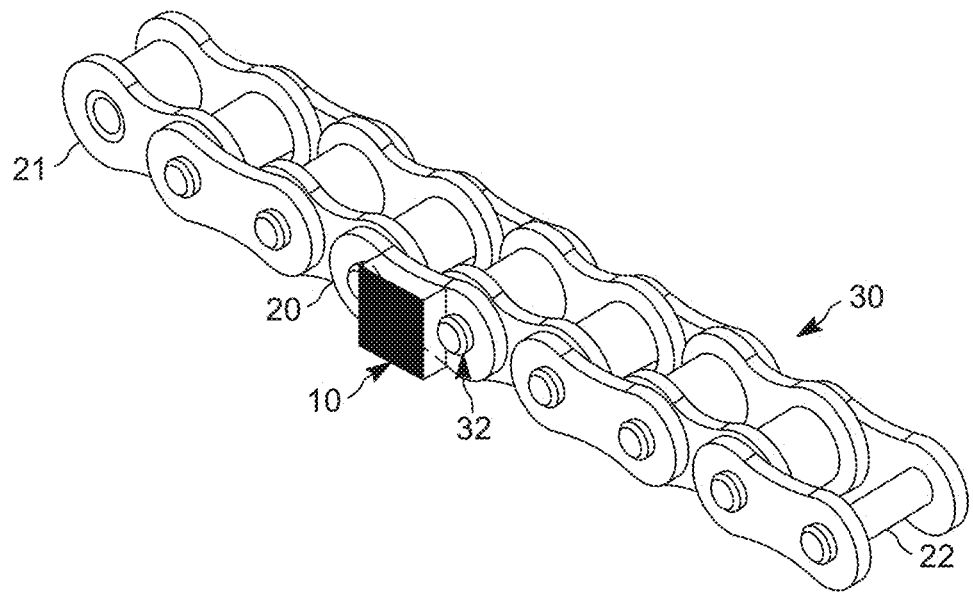
FIGS. 2A to 2D illustrate several example chain monitoring systems mounted to a chain, in accordance with aspects of this disclosure.
Figure 2B:
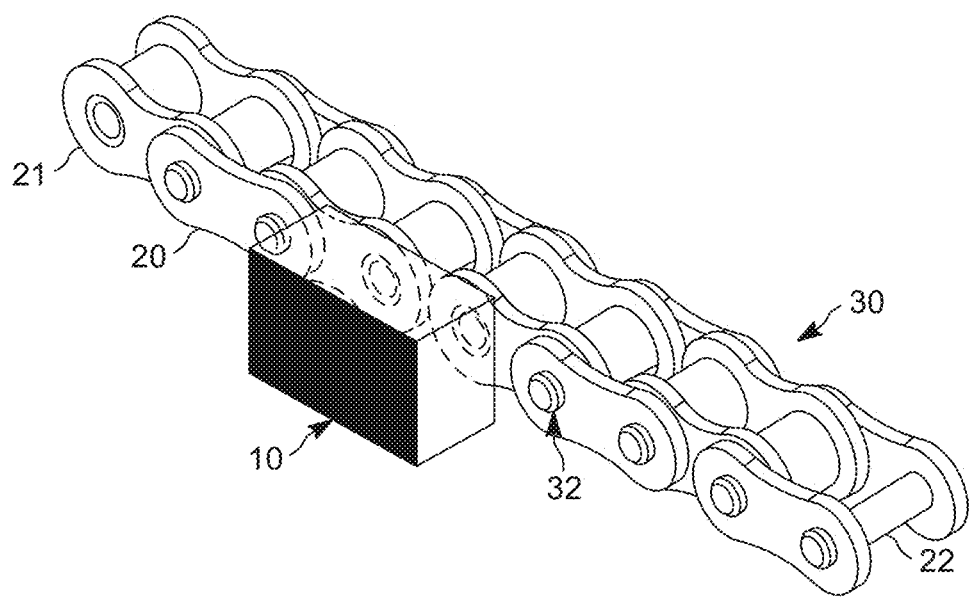
Figure 2C:
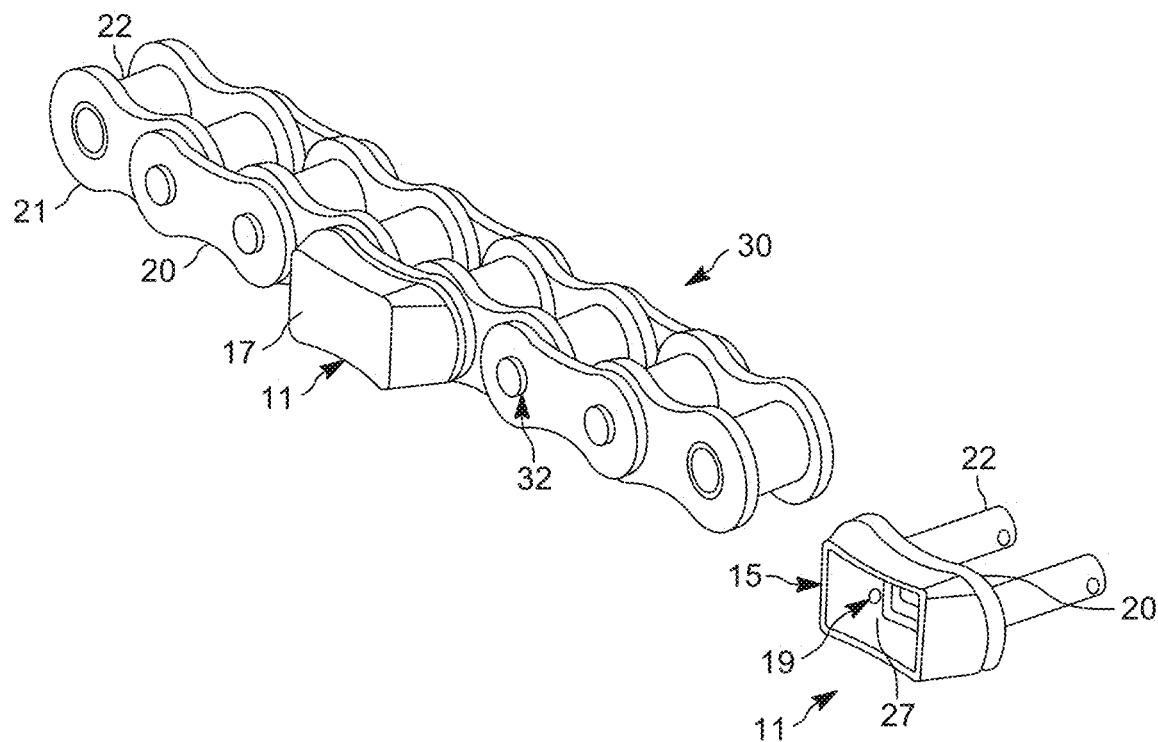

FIGS. 2A and 2B illustrate examples of the chain monitoring system 10 mounted to a chain 30 via plate 20. The types of chain for the disclosed monitoring system include roller or transmission chains (e.g., chains comprising of a plurality of link plates 20, 21, interconnected by one or more transverse pins 22), for use with machinery such as gear motors, clutches, cable carriers, and associated components. In examples, the chain 30 includes opposing pairs of internal link plates 21, with another pair of opposed external link plates 20 overlapping the inner link plates 21. One or more of the pins 22 extend through holes in the plates to secure the opposing and overlapping plates in a serial fashion to create a complete length of chain.

As shown, the pins 22 extend through and connect internal and external plates 20, 21, on each side of the chain 30. The pins 22 terminate on one or both lateral surfaces of the external plates 20, which may extend a portion 32 from the lateral surface. As shown in FIG. 2A, the system 10 may be mounted to the external plate 20 such that the system enclosure fits within the extended portions 32. In this example, the system 10 avoids sprockets that may be used to drive the chain 30 during use.

By mounting the system 10 directly to the link plate 20, forces (e.g., strain, impact, acceleration, etc.) experienced by the link plate 20 to which the system 10 is fixed are transferred directly to the sensors within. In particular, the arrangement puts the sensors in close proximity to the pins 22, which are driven by sprockets to move the chain 30, and thereby experience direct and concentrated forces during use. Thus, parameter values and changes thereof are more accurately measured by the sensors, with associated information being transmitted to processing circuitry as an output voltage signal (for processing, analysis, storage, and/or transmission).

In another example shown in FIG. 2B, the system 10 may be mounted to the external plate 20 and encompass one or more extended portions 32. The system 10 may be mounted by any technique disclosed herein, as well as by use of an extended pin 22 to secure one or more portions of the body 14 to the extension 32 and/or the plate 20. In the illustrated examples, the system 10 is mounted to a single external plate 20. However, in some examples, the system 10 enclosure may span two or more external plates 20, and/or components of the system 10 may be in separate enclosures mounted on different external plates 20.

FIGS. 2C-2F illustrate examples of an additional or alternative chain monitoring system 11 mounted to a chain 30 via plate 20. Chain monitoring system 11, which includes one or more of a mounting mechanism 12, a body 15, a cover 17, and one or more mounting devices/fasteners 19. As shown, system 11 is mounted on a plate 20 by use of mounting device 19, such as an adhesive, solder and/or weld, a screw-type or a snap-fit fastener to removably fix the system 11 to the plate 20, to name a few non-limiting examples. The cover 17 may be secured to the body 15 via a snap-fit mating feature, a screw 18 or other fastener, adhesive, solder and/or weld, or may be otherwise integrated with a material of the body. Once the cover 17 is removed, a void 27 is exposed within the body through which mounting devices 19 can be employed.

Figure 2D:
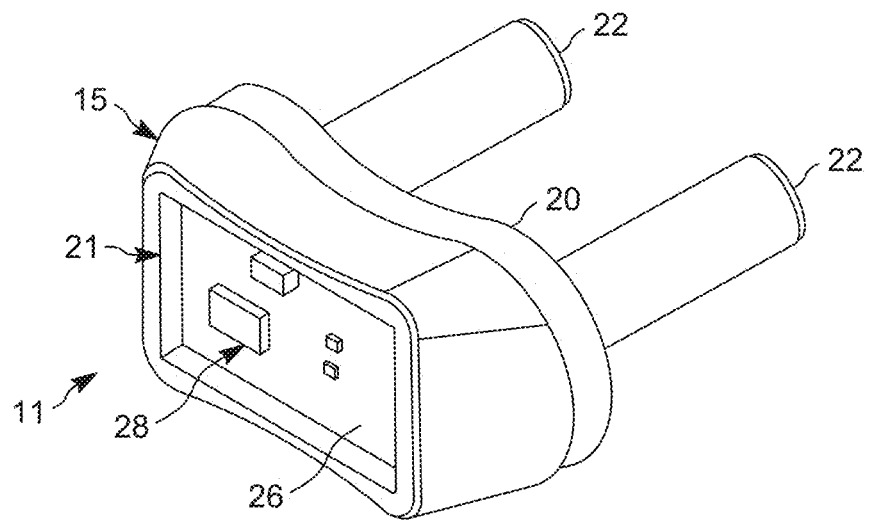
Figure 3:
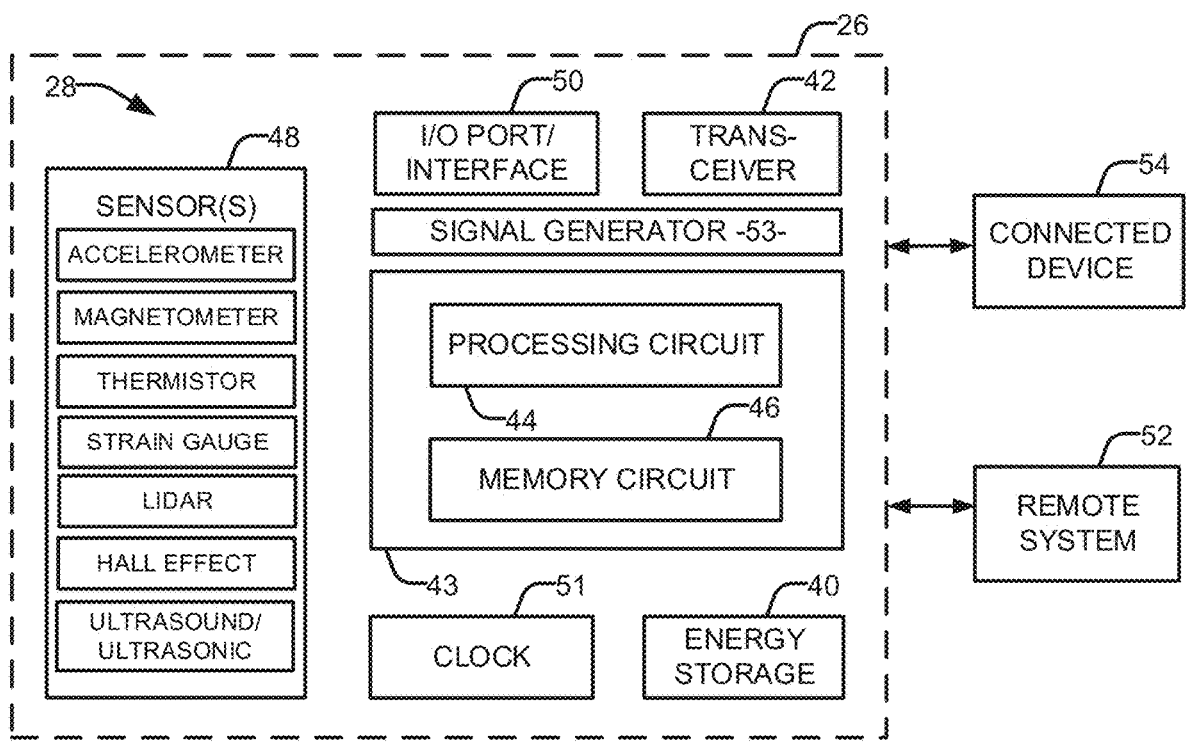
FIG. 3 is a block diagram of a controller of the chain monitoring system of FIGS. 1-2B, in accordance with aspects of this disclosure.

In the example of FIG. 2D, the example system 11 with the cover 17 removed reveals a printed circuit board (PCB) 26, comprising one or more components 28 (similar to FIG. 2B and described in greater detail with respect to FIG. 3). Although illustrated with a removable cover 17, in some examples the cover 17 is fixed, such that the system 11 is entirely enclosed. In either configuration, the mounted system 11 can be sealed in a closed configuration such that the PCB 26 and components 28 are free of moisture and/or environmental contaminants.

In a comparison of the various example systems provided in FIGS. 1A to 2D, it is shown that a variety of geometries and/or sizes may be employed in accordance with the present disclosure. For example, FIG. 1A illustrates a system 10 with a generally oblong shape with a base having dimensions that fit within the area of the plate. FIGS. 2A-2D illustrate an alternative system 11 with a generally rectangular body, which may fit between the extended portions or extend beyond the plate altogether. In the example system of FIGS. 2C-2D, the system geometry exhibits a curvature that follows the shape of the plate upon which the system is mounted. For example, in some applications, one or more geometries and/or dimensions, in absolute terms or relative to the particular chain 30 upon which the system operates, may ensure the chain operates without exposing the system to collision during transmission and/or ensures debris and/or contaminants are unlikely to collect on the exterior of the system.

In use as part of a chain drive assembly (e.g., for power transmission, motion control products, lifting applications, conveyance applications, etc.), the chain 30 is subjected to varying forces, causing stress on the chain 30 and the chain components. The amount and location of the forces as they act on the chain 30 cause wear on the chain, which can impact the remaining serviceable life of the chain. In order to determine one or more characteristics of the chain 30, including chain wear and elongation, the sensors contained in the system 10 measure one or more parameters and process the information via one or more algorithms (e.g., at the system 10 processing circuitry and/or at a remote system) to determine changes corresponding to the parameters and/or associated characteristics (e.g., system variables).

FIG. 3 is a block diagram of a controller of the chain monitoring system 10. For example, as shown in FIG. 1B, the PCB 26 includes multiple components 28, including one or more of an energy storage device 40, one or more transceivers 42 (or a transmitter and/or receiver), a signal generator 53, a signal processing and/or data storage circuitry 43 (e.g., a Bluetooth circuit or chip), which may include processing circuitry 44 and/or memory storage circuitry 46 (which may include one or more databases), and/or one or more sensors 48. The sensors 48 may include one or more of a strain gauge, a temperature sensor such as a thermistor, an inertial measurement unit (IMU) which may include an accelerometer, a location sensor such as a global positioning system (GPS) enabled device, a magnetometer, a hall effect sensor, a LIDAR sensor, an optical sensor, an infrared sensor, an ultrasonic or ultrasound sensor, as a number of non-limiting examples. A clock or other timing device 51 may be connected to the processing circuitry 44 or other components 28, as well as an input/output port or interface 50 to provide access to one or more of the connected devices 54 and/or remote systems 52.

Signals from the sensors 48 can be processed by the processing circuitry 44, which may include one or more of an amplifier and/or converter (e.g., an Analog to Digital converter (ADC)). The information contained in the signals can be stored in the memory circuit 46 and/or transmitted to a remote system 52, such as via transceiver 42 (which may additionally or alternatively include an amplifier and/or converter). For instance, information can be transmitted periodically or on command, such as at the start of an operation employing the chain 30.

The chain monitoring system 10 may be in wireless communication with the remote system 52 (e.g., a computing platform including a general-purpose computer, a portable smart device, etc.). The remote device may provide additional processing capabilities, including logging sensor information, analyzing such information and displaying current status of related parameters being monitored, for example. The system 10 and remote system 52 may communicate by use of one or more transmission protocols, including circuitry (e.g., interface 50 and/or transceiver 42) capable of communicating via wireless protocols, such as one or more direct wireless communication protocols. In a non-limiting example, Bluetooth Low Energy (e.g., Bluetooth LE or BLE) is configured to maintain a serviceable communication range while operating with reduced power consumption. Bluetooth LE may employ 2.4 GHz radio frequencies using a simple transmission modulation system.

In some examples, other wireless communication protocols may be employed, such as IEEE 802.15.1 Bluetooth (e.g., via a Bluetooth processor configured to pole the sensors and communicate via an ASCII data stream via Bluetooth communications to communicate with a Bluetooth UART application in the receiving device), IEEE 802.15.4 with or without a ZigBee stack, IEEE 802.11x Wi-Fi, and so forth.

The system 10 can operate as a data store during use by capturing measurement information over a period of time until a data transfer is performed. In this manner, the processing circuitry 44 is configured to record, time stamp, and store the sensor output in memory circuit 46. Information can be stored in the database 50 for later transmission and processing at the remote system 52.

In some examples, the processing circuitry 44 can perform a limited amount of processing (e.g., signal filtering, format conversion, data comparison to one or more parameter threshold values stored on the database 50) prior to or in addition to transmission of information to the remote system 52. Alternatively, or additionally, the data may be downloaded to a remote system 52 for storage and/or further analysis. For example, the data captured by the sensors 48 is transmitted by the transceiver 42 (e.g., via the Bluetooth protocol) either in real-time or after the event to the remote system 52.

The data can be analyzed, for example, to determine the amount of time that the chain 30 has been in use (e.g., over the life of the chain, for a particular application, over a specific time period, etc.). In some examples, timing data is applied to other measurements, such as forces and/or load information, to determine the amount of time the chain 30 has been experiencing a particular load, force, etc. This information can be used to determine a more useful measure of wear and/or elongation, rather than simple time-in-service and/or force measurements alone. Accordingly, detailed parameter measurements may be obtained during a change in chain operations and analyzed in view of particular applications (e.g., power transmission, conveyance, etc.).

Additionally, a change in magnitude of values and data calculations that indicate trends or changes in operation compared to past history may be actionable by notification to user. Collection, analysis, and/or calculation of one or more variables informs the notification determination. Variables, such as monitored chain parameters, include but are not limited to wear, temperature, load, time, etc. For example, an increased rate of wear is meaningful in predicting end of chain life and/or allows a user and/or control circuitry to take actions to address the root cause of the conditions creating the wear.

The sensor 48 measurements can also be compared to one or more threshold values, including one or more variables such as parameter and/or chain characteristics values stored in database 50. As described with respect to FIGS. 7A-7C, the remote system 52 provides tools to customize threshold operating values In some examples, if one or more of the variables (e.g., parameters and/or the chain characteristics) exceeds a threshold value (e.g., corresponding to a shock load to the chain, high temperature, and/or another parameter corresponding to end of life wear elongation condition) the information can be transmitted to the remote system 52 automatically (e.g., overriding a periodic transmission schedule) and alert the remote system 52. In some examples, the information can be used to command a connected device 54 (e.g., a machine in which the chain functions) to change and/or halt operations until service can be performed. As provided in with respect to FIGS. 7A-7C, the particular parameters and/or characteristics and/or the associated thresholds values and/or the resulting actions are customizable via a user interface and customization tool of the remote system 52.

A record of the amount or number of times the chain 30 has exceeded a particular threshold and/or the absolute value of those measurements can be stored and/or transmitted for analysis. This information can be processed via one or more algorithms to determine one or more characteristic values associated with chain serviceability (e.g., wear, elongation, remaining service life under historical or anticipated conditions, etc.).

For example, in response to an external force (e.g., load or strain), the chain will begin to wear, elongate or otherwise deform in accordance with one or models and/or algorithms. As the load and/or wear on the chain increases (e.g., as an operation commences), the chain material initially experiences, under which normal operation and performance are expected. This can be calculated based on sensor data, as stress is proportional to strain on the chain. In some examples, a particular elongation status or range of statuses may be predetermined, such as by a manufacturer. If the load on the chain continues to increase, the wear, elongation or deformation of the chain may reach a maximum threshold value, which may be beyond a range of operating values (e.g., predetermined, calculated based on the model, etc.).

The chain monitoring system 10 may employ an algorithm to determine a threshold operation elongation value or range prior to the maximum threshold value. The threshold operation elongation value represents a value (or range of values) below which proper operation of the chain is expected. Based on received sensor measurements, the processing circuitry 44 (and/or the remote system 52) may determine an elongation value for the chain, which may be modified by one or more techniques (e.g., applying a filtering function, calculating an average of values, applying a weighted factor, to one or more measured or calculated parameter values). If the elongation value exceeds the maximum threshold elongation value, the processing circuitry 44 generates an alert, as disclosed herein.

In some examples, the system is configured to calculate or otherwise determine a shock load impacting the chain. For instance, the device is configured to continuously or periodically monitor a sensor (such as an on-board accelerometer) for changes in acceleration.

A sudden and/or rapid change in acceleration to the chain may be compared to one or more threshold values (e.g., in a listing of values, evaluated at the processing circuitry 44 and/or remote device) corresponding to a shock event. For example, a shock event may result from a sudden jolt (e.g., from starting/stopping the chain, introduction or removal of a load to the chain or system, a system jam, etc.). The processing circuitry 44 registers an abnormally high value, which may be characterized in accordance with one or more of the threshold values. Upon determination that a shock event has occurred (and/or a particular threshold has been exceeded), the processing circuitry 44 commands a rapid and/or immediate reading from one or more sensors 48 (e.g., the on-board strain gauge).

Accelerometer, strain gauge, and other readings associated with a determined shock event (including a timestamp for such an event) may be recorded in the memory circuitry 46. Analysis of the shock events may be employed in one or more algorithms to determine one or more characteristics of the chain (e.g., wear, elongation, remaining useful life, etc.).

In some examples, in addition to being sent to the remote system 52, the alert(s) may be one or more of a visual indicator, an audible alert and presented at the system 10 (e.g., on an external surface of the body 14 or cover 16) to indicate a threshold has been violated. The alert may also provide status information (e.g., inability to transmit, energy storage level, an alert corresponding to one or more chain characteristics, etc.).

In some additional or alternative examples, the energy storage device 40 can be any type of battery suitable to provide the components of system 10 with power. The battery can be rechargeable, such that battery may be recharged wirelessly, such as by a current induced via a power source and/or rechargeable via kinetic energy transferred to the battery thought movement of the chain 30 during operation.

Figure 4A:
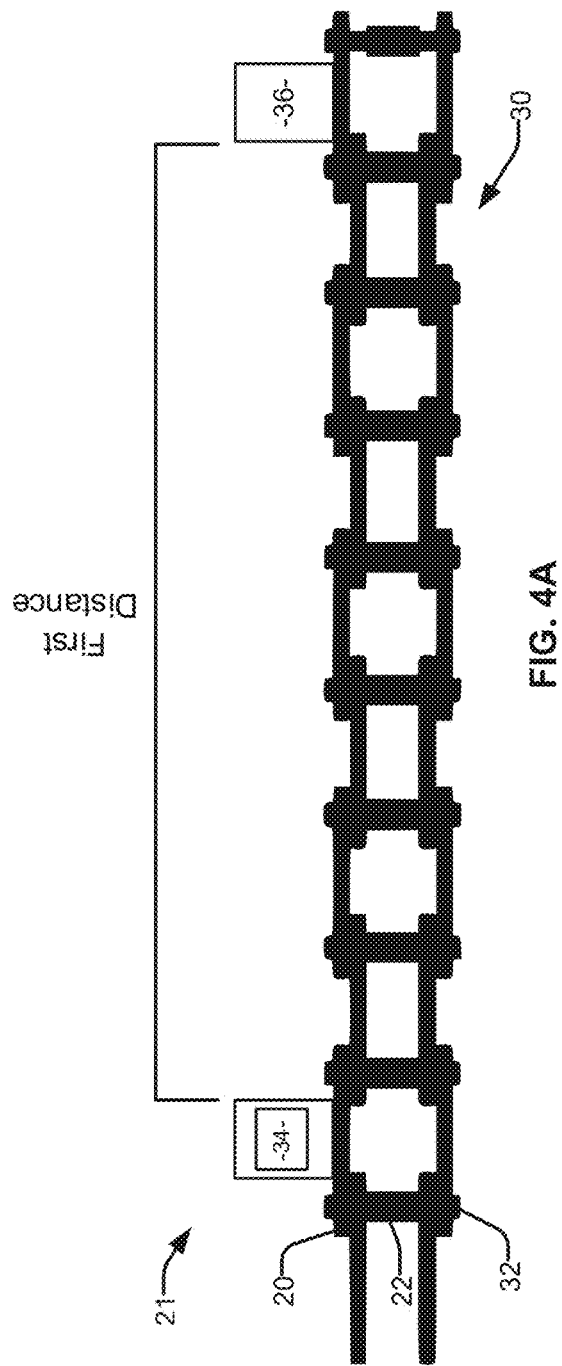
FIGS. 4A and 4B illustrate an example chain monitoring system employing a magnetic measurement system, in accordance with aspects of this disclosure.
Figure 4B:
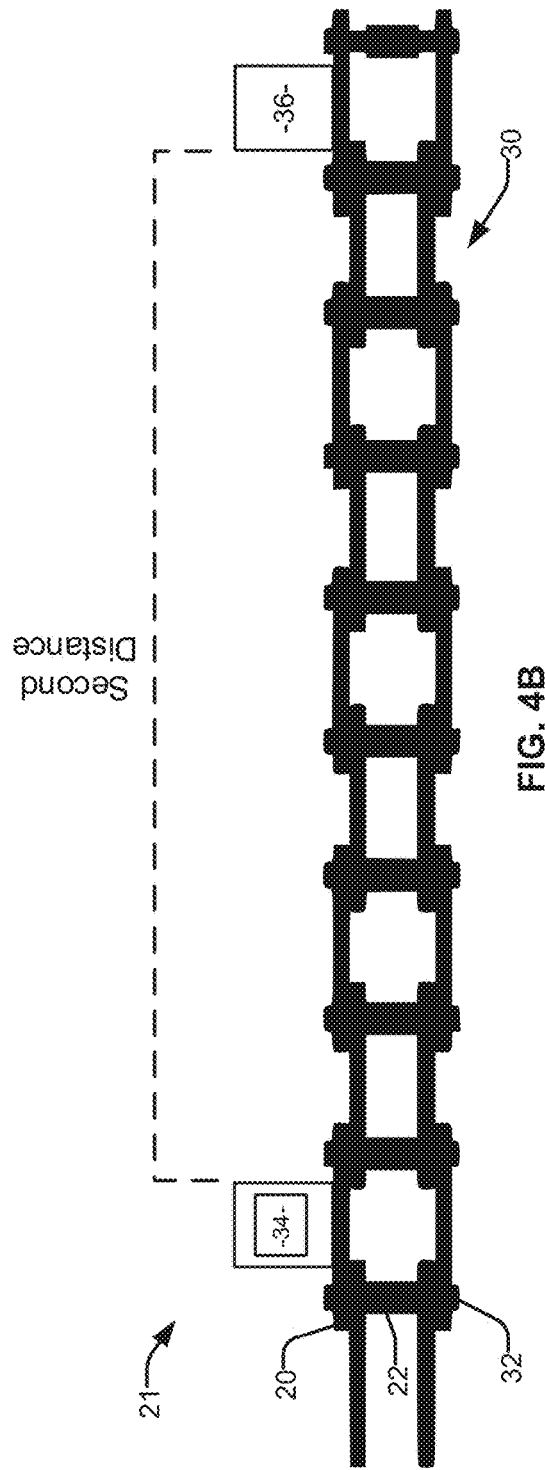

FIGS. 4A and 4B illustrate an example chain monitoring system employing a magnetic measurement technique, in accordance with aspects of this disclosure. In the example of FIGS. 4A and 4B, the chain monitoring system 21 includes a primary device, such as magnetic sensor 34 (e.g., a magnetometer, Hall effect sensor, etc.) configured to sense a magnetic field from an associated secondary device, such as a magnetic source 36 (e.g., a permanent magnet) mounted on the chain 30. For instance, the magnet 36 may be mounted on a section of chain a distance from the chain monitoring system 21 (e.g., the distance being on the order of millimeters to meters). A first distance (e.g., at manufacturing, installation, calibration, etc.) may be known and fixed relative to the number of plates 20 between the system 21 and the magnet 36. For example, a calibration process may measure the magnetic field from the magnet 36 at the magnetometer 34 (e.g., at manufacture of the system, at installation of the chain and/or the magnet, before or after use of the chain, etc.). Although the sensor 34 and magnetic source 36 are illustrated as being separated by multiple chain links, in some examples the sensor 34 and magnetic source 36 are arranged on adjacent links.

Subsequent readings from the magnetometer 34 may be compared over time (e.g., to the initial calibrated magnetic field value and/or intermediate measurements) to identify any change in the magnetic field between the chain monitoring system 21 and the magnet 36. The measured changes in the magnetic field represent a change in distance between the chain monitoring system 21 and the magnet 36. The values and/or change in values may be processed (e.g., at the processing circuitry 44 or the remote device 52) to determine one or more characteristics of the chain (e.g., elongation, strain, temperature, amount of wear, remaining amount of service time, etc.). The determined characteristics may be used to alert a user of a need for service and/or command a connected device 54 to change and/or stop operation (in accordance with predetermined instructions).

The measuring, transmission, receipt, and/or processing of data and measurements may be subjected to filters, averaging, and/or other compensation factors, such as mechanical and/or software applications. In some examples, the filtering may identify and/or predict disturbances in measurement and/or processing associated with vibrations or electromagnetic emissions from a motor drive and other electrical disturbances. Additionally or alternatively, measurements may be analyzed to identify particular events, and to record parameters associated with chain characteristics during such events (e.g., to record elongation at a time when the chain is experiencing the greatest load). In some examples, when the chain will be experiencing a particular load condition during operation, such as when a section of the chain will pass by or otherwise interact with a portion of the machine, and/or when the chain is calculated to experience a particular condition, such as slack, a particular amount of force applied to a sprocket, etc.

Figures 5A, 5B:
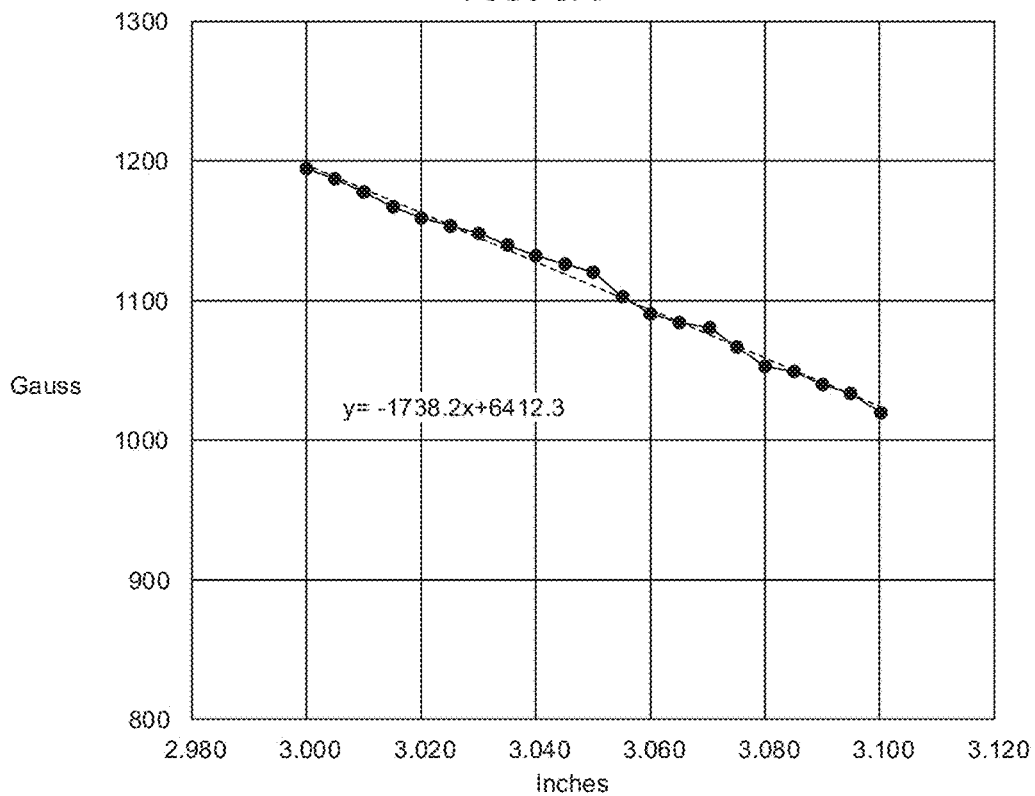
FIGS. 5A and 5B illustrate example representative data from a chain monitoring system employing a magnetic measurement system, in accordance with aspects of this disclosure.

FIGS. 5A and 5B illustrate example representative data from a chain monitoring system employing a magnetic measurement system. As shown in FIG. 5A, experimental data compares distance measurements, in inches, from Vernier in column 37. Experimental measurements from a magnetometer such as magnetometer 34, in gauss, is provided in column 38. Column 39 represents a calculated conversion based on the slope equation represented in the graph provided in FIG. 5B. As shown, the calculated values, in inches, provided in column 39 closely reflect the actual measured distance values provided in column 37.

FIG. 6 illustrates an example roller chain wear-life guide 60 for a chain monitoring system. As shown, a grid relates chain wear and/or elongation information with predetermined thresholds, corresponding status information, and proposed guidance for taking action. For example, row 62 provides a header for each column, such as wear/elongation amount percentage in column 70, chain status in column 72, and recommended action in column 74. Each column has a section corresponding to an incremental increase of wear, as provided in rows 64 to 68. The rows show an increasing amount of wear in column 70, represented as a percentage but may be indicated as a measured or calculated value. A corresponding status is shown in column 72, which may correspond to one or more alerts (e.g., a visual indicator on the chain monitoring system 10). Further, actionable guidance is provided in column 74, which may include maintenance or replacement recommendations. As provided, thresholds which define the status alerts, as well as the recommended actionable guidance, are customizable via a user interface (e.g., as shown in FIGS. 7A-7C).

FIGS. 7A-7C illustrate an example user interface for a chain monitoring systems, such as integrated with a remote system 52 (e.g., a smartphone application, software on a general-purpose computing platform, etc.). In disclosed examples, monitoring and communication processes (e.g., monitoring frequency, value ranges, parameters, time of start, stop or duration, etc.) may be customized, such as via a user interface and/or one or more customization tools of the remote system 52. For example, the frequency with which the system 10 takes measurements, value ranges, specific parameters to be measured, time of start, stop or duration of interrogation, what information to process at the processor circuitry 44 (if at all), and/or frequency and scope of communication between the system 10 and the remote system 52 can be set via the customization tool.

As illustrated, the user interface of FIG. 7A provides a dashboard, which displays readings and/or status of one or more parameters (e.g., temperature, starts per day, speed, GPS, battery life) as well as chain characteristics (e.g., wear, load) for a particular chain (e.g., RS50D1/SK2L located in Oven #4). FIG. 7B provides a configuration screen allowing a user to set tolerance limits for various parameters and/or characteristics, as well as customization of notifications. FIG. 7C provides a configuration screen for general identification and refresh rates for information transfer between the system 10 and the remote system 52.

Figure 7D:
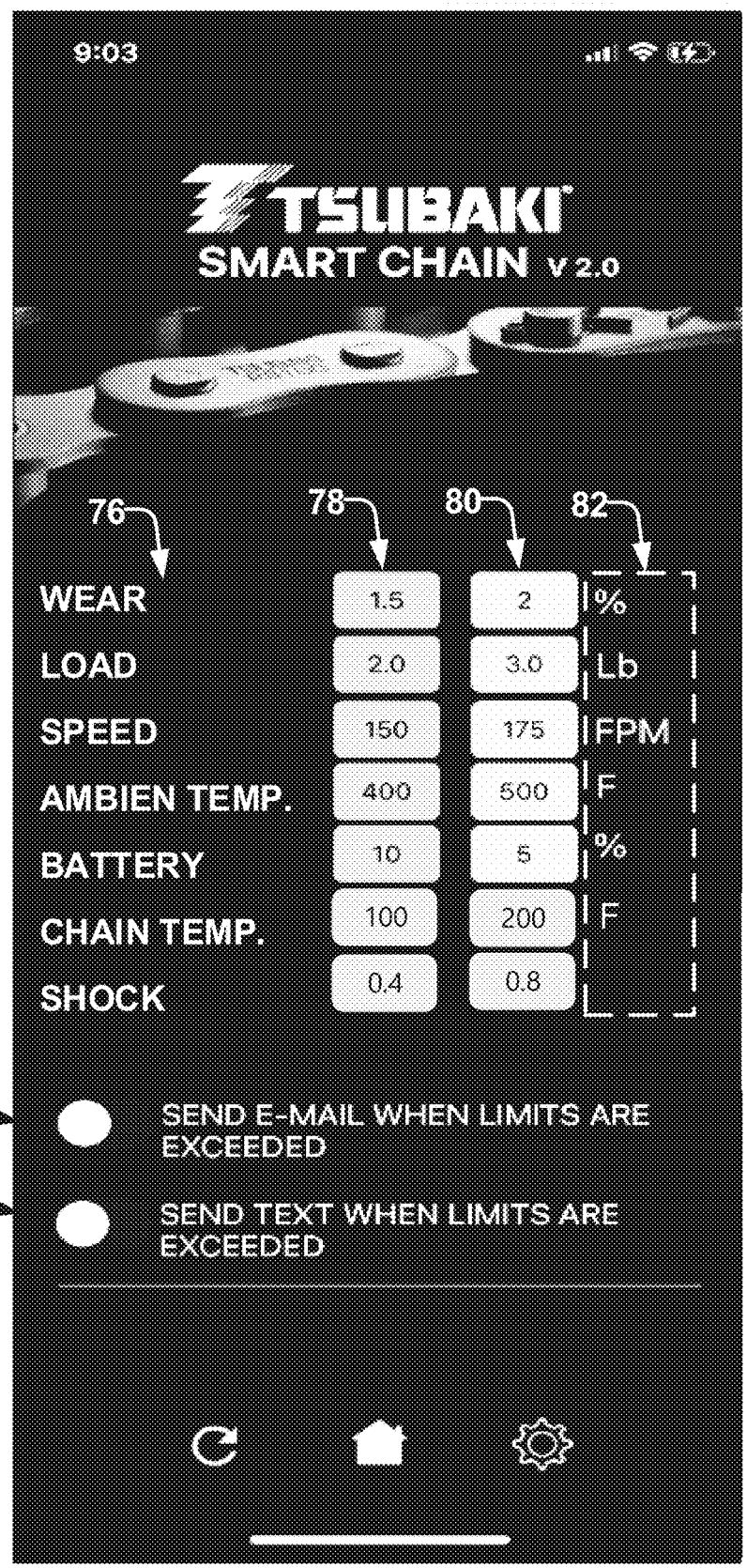
FIG. 7D illustrates another example user interface for a chain monitoring system, in accordance with aspects of this disclosure.

As illustrated, the user interface of FIG. 7D provides a dashboard, which displays readings and/or status of one or more chain parameters and/or characteristics 76 (e.g., wear, load, speed, temperature, starts per day, shock, battery life, GPS) for a particular chain. A measured and/or calculated numerical value (e.g., from a measured and/or received input) may be presented in a corresponding display in column 78. Limits and/or desired values may be listed in a corresponding display in column 80. Column 82 indicates units and/or parameters for presentation of the parameters, characteristics, and/or values, which may be adjusted by a user to set tolerance limits, as well as customization of notifications.

In some examples, the dashboard is customizable to include one or more graphical and/or numerical indicators of wear, load, temperature, shock, speed, battery life, start and/or stops (e.g., number or time of start/stops), as a non-limiting list of examples. The particular chain characteristic may be provided in column 76, with a listing of associated caution limits in column 78 (e.g., a first threshold value) and a listing of associated warning limits in column 80 (e.g., a second threshold value). In some examples, one or more of the characteristics or associated thresholds may be adjusted, by a user input and/or based on another use identifier (e.g., a particular chain, machine, application, environment, etc.).

Figure 8A:
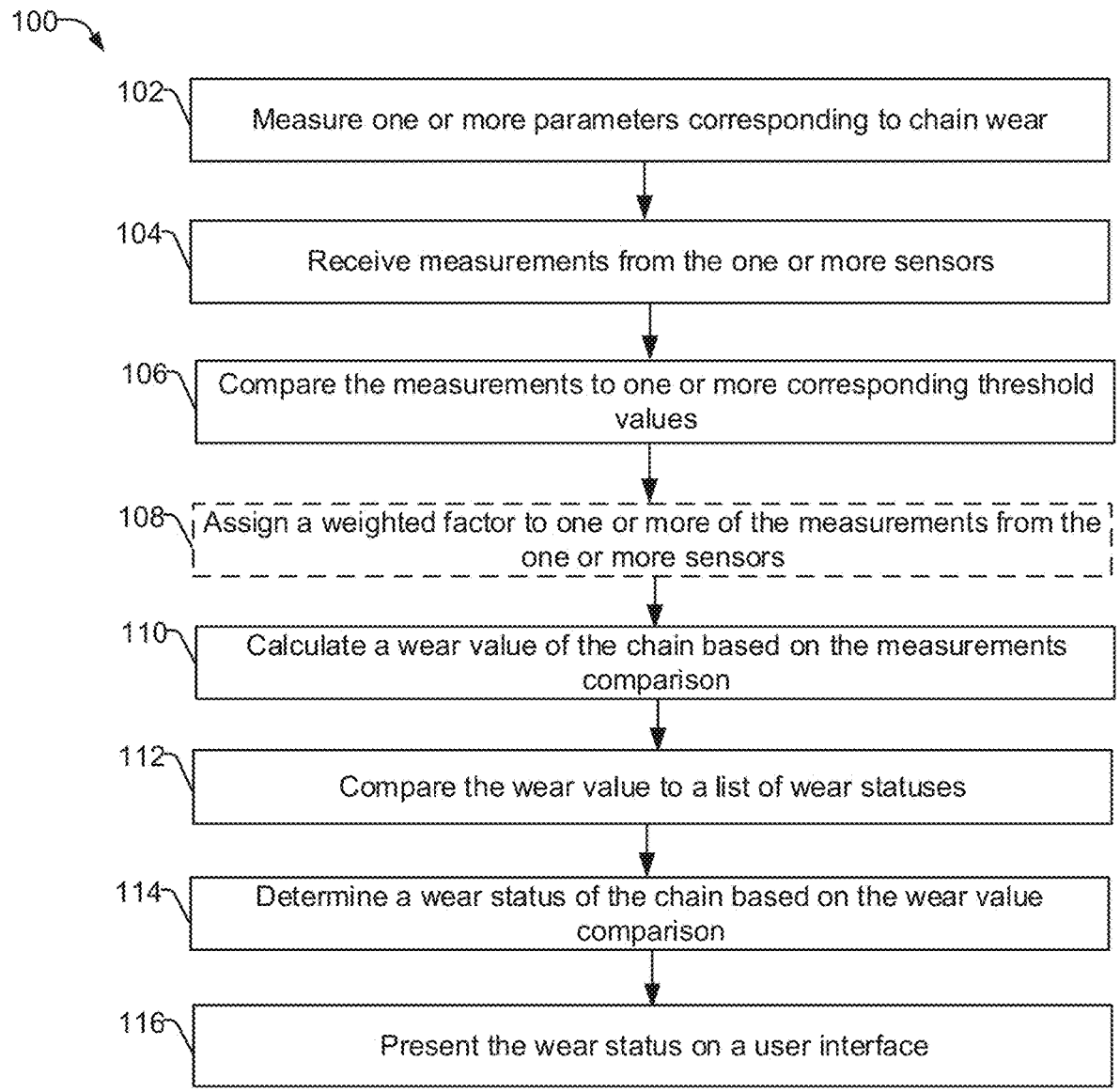
FIGS. 8A and 8B provide flowcharts representative of example machine readable instructions which may be executed by the example chain monitoring system, in accordance with aspects of this disclosure.

FIG. 8A provides a flowchart representative of example machine readable instructions 100 which may be executed by the example chain monitoring system 10 of FIG. 1A, to monitor a chain wear status and provide information to that effect. The example instructions 100 may be stored in the memory circuitry 46 and executed by the processor circuitry 44 of the circuit 43 (and/or processing circuitry associated with remote system 52). The example instructions 100 are described below with reference to the example chain monitoring system 10 of FIGS. 1 through 7.

In block 102, one or more sensors measure one or more parameters corresponding to chain wear. The one or more parameters may include a temperature, time in service, speed, load of the chain, as a list of non-limiting examples.

In block 104, processing circuitry receives measurements from the one or more sensors. In block 106, the processing circuitry compares the measurements to one or more corresponding threshold values. The threshold values may correspond to a particular parameter and/or sensor, and may be predetermined and/or updated based on sensor data and/or user input.

Optionally, in block 108, the processing circuitry assign a weighted factor to one or more of the measurements from the one or more sensors. For example, the weighted factor is assigned before or after the measurements comparison.

In block 110, the processing circuitry calculates a wear value of the chain based on the measurements comparison.

For example, multiple threshold ranges may be used in the comparison, with each corresponding to a different wear status (as shown in FIG. 6). The processing circuitry may then apply each measurement and/or measurement comparison (e.g., from one or more of the parameters) to a model and/or algorithm. The resulting calculation represents input from each parameter to determine a value and/or range of values corresponding to wear of the chain.

In block 112, the processing circuitry compares the wear value to a list of wear statuses. And in block 114, the processing circuitry determines a wear status of the chain based on the wear value comparison, and presents the wear status on a user interface in block 116.

Figure 8B:
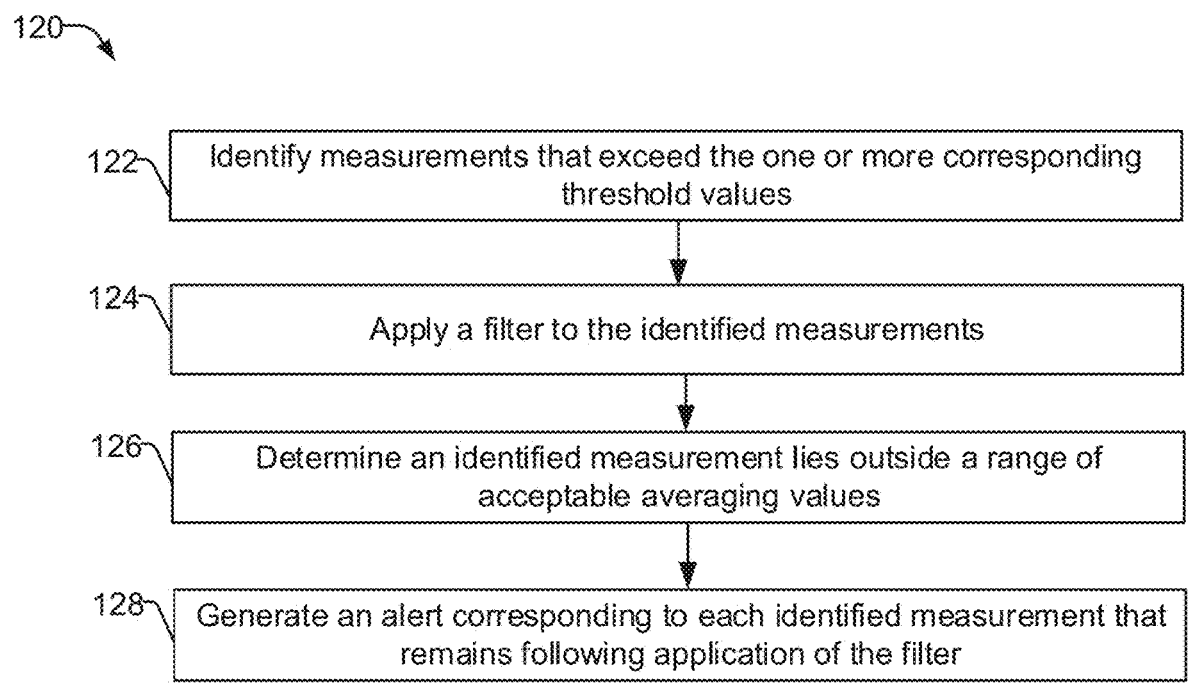

In an additional or optional method 120, illustrated in FIG. 8B, the processing circuitry identifies measurements that exceed the one or more corresponding threshold values within a predetermined interval, in block 122. In some examples, the processing circuitry applies a filter to the identified measurements to mitigate signal noise, in block 124. In some examples, the filter is an averaging function applied over the predetermined interval or a plurality of predetermined intervals.

In block 126, the processing circuitry determines an identified measurement lies outside a range of acceptable averaging values. In block 128, the processing circuitry generates an alert corresponding to each identified measurement that remains following application of the filter.

FIGS. 9A-9D illustrate examples of an additional or alternative chain monitoring system 210 mounted to a chain 230 via plate 220. Chain monitoring system 210, which includes one or more of a body 214, a cover 216, and one or more mounting devices/fasteners 219 to secure the system 210 onto a plate 220. The plate 220 differs from the plate 20 insomuch that insertion of the pin 222 through the plate 220 and into the chain 230 results in a generally flat surface upon which to mount the system 214.

Figure 9A:
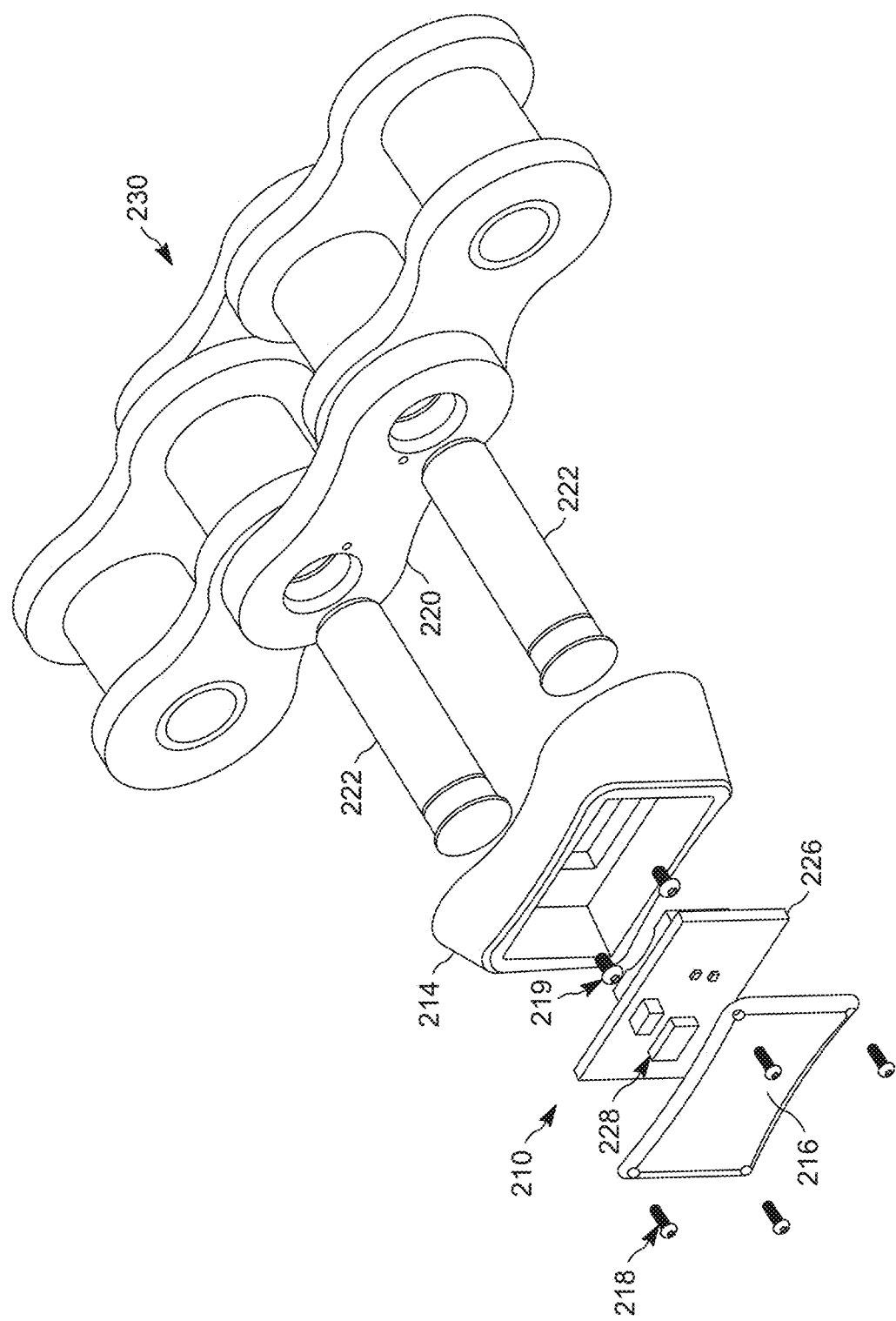
FIGS. 9A-9D illustrate examples of an additional or alternative chain monitoring system mounted to a chain via plate, in accordance with aspects of this disclosure.

In the example of FIG. 9A, the example system 210 with the cover 216 is removed reveals a printed circuit board (PCB) 226, comprising one or more components 228 (similar to FIG. 2B and described in greater detail with respect to FIG. 3).

Figure 9B:
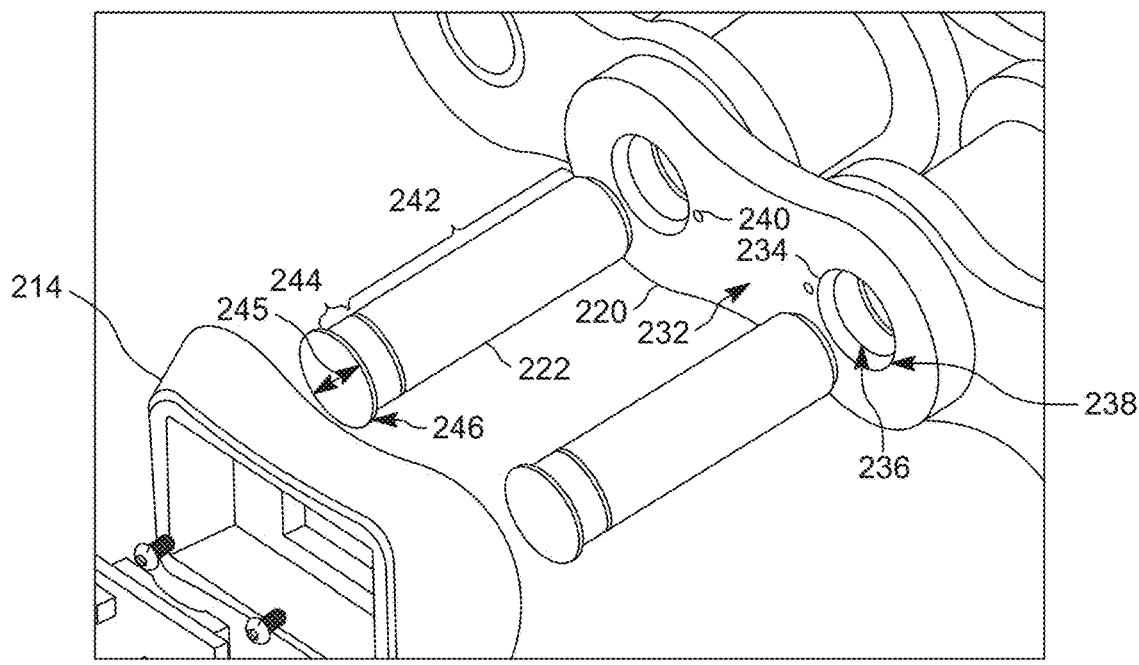

FIG. 9B provides a detailed view of the plate 220 and pins 220. For example, plate 220 has a generally flat surface 232, interrupted by one or more fastener holes 240 and/or one or more pin insertion openings 234. As provided, openings 234 have two or more internal diameters 236 and 238. Internal diameter 236, located away from the surface 232, is dimensioned with a diameter greater than portion 242 while accepting the diameter of portion 242 of pin 222 with little tolerance. The diameter 236 is dimensioned such that portion 244 of the pin 222 creates friction with the plate (e.g., is retained by a press- or interference-fit or other technique), such that the pin is secure once the pin 22 is fully inserted within the opening 234. Internal diameter 238 is located adjacent the surface 232 and dimensioned to accept the lip 246 such that a surface 245 of the pin 222 is flush with the surface 232 when inserted. The resulting surface is a generally flat, planar surface, providing a flat surface upon which to mount the system 210, as well as removing extensions outward from the plate (e.g., eliminating extended portions 32).

Figure 9C:
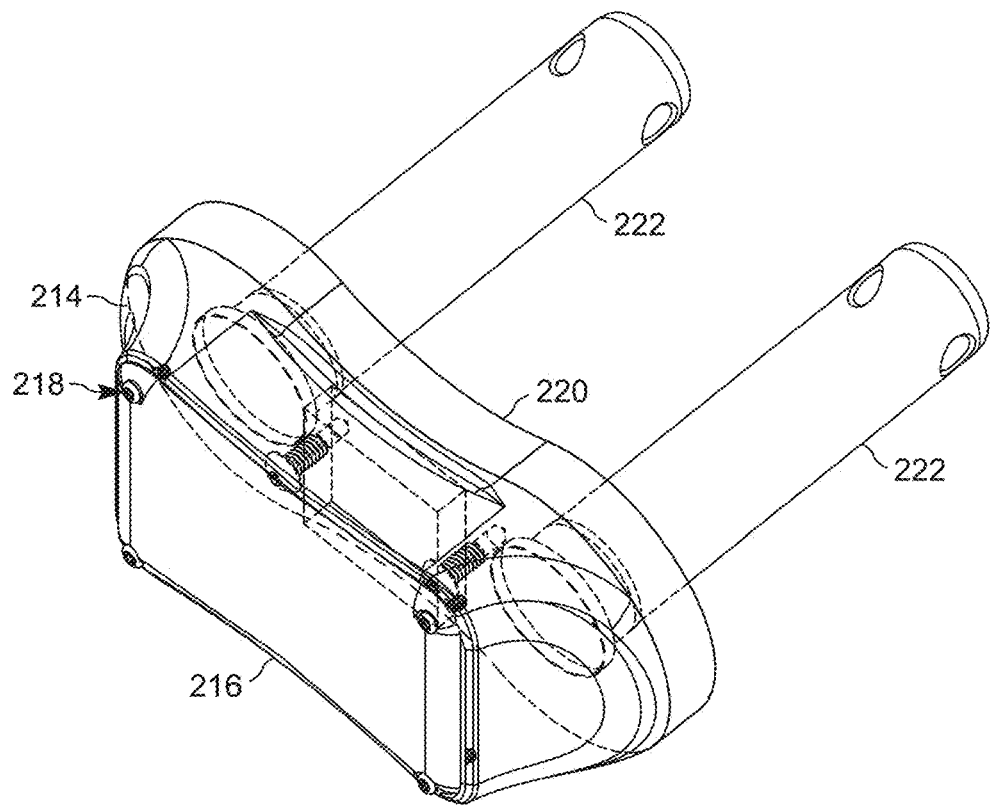
Figure 9D:
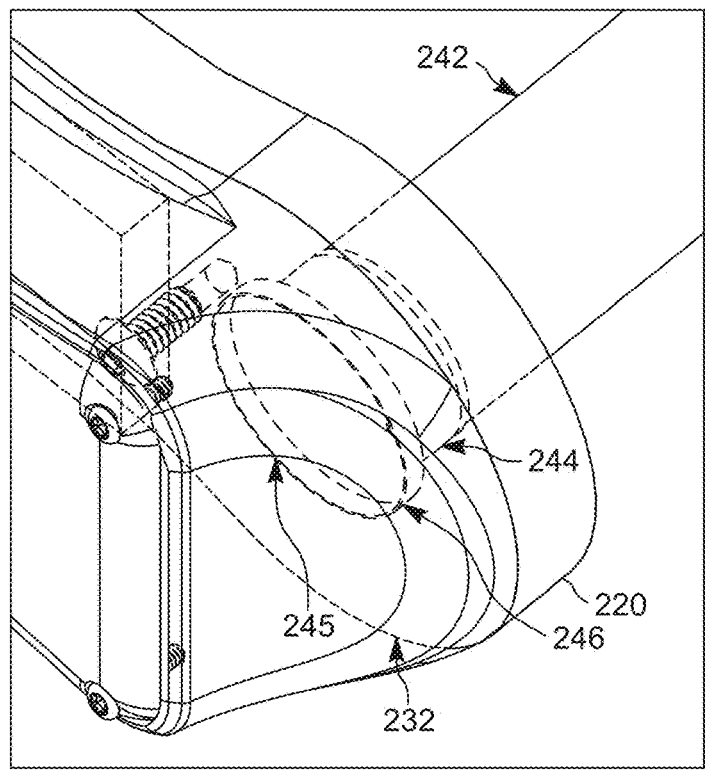

FIGS. 9C and 9D illustrate the system 210 with the cover 216 in place. As shown, the pins 222 have been inserted, such that the surface 245 is flush with the surface 232 of the plate 220. In some examples, the lip 246 is configured to be inserted through the body 214, such that securing the pin 222 with the chain 230 serves to mount the system 210 to the chain 230 as well. In some examples, the plate 220 is manufactured as a single unit comprising the plate 220 and the body 214, such as by casting, stamping, additive manufacturing, etc. Thus, assembly of the chain 230 with pins 222 and plate 220/body 214 provides a fixed housing to insert the PCB 226 and/or the components 228. In some examples, the pins 222 are secured to the chain 230 by one or more fasteners (e.g., cotter pins, bolt, welding, adhesive, etc.).

Figure 10A:
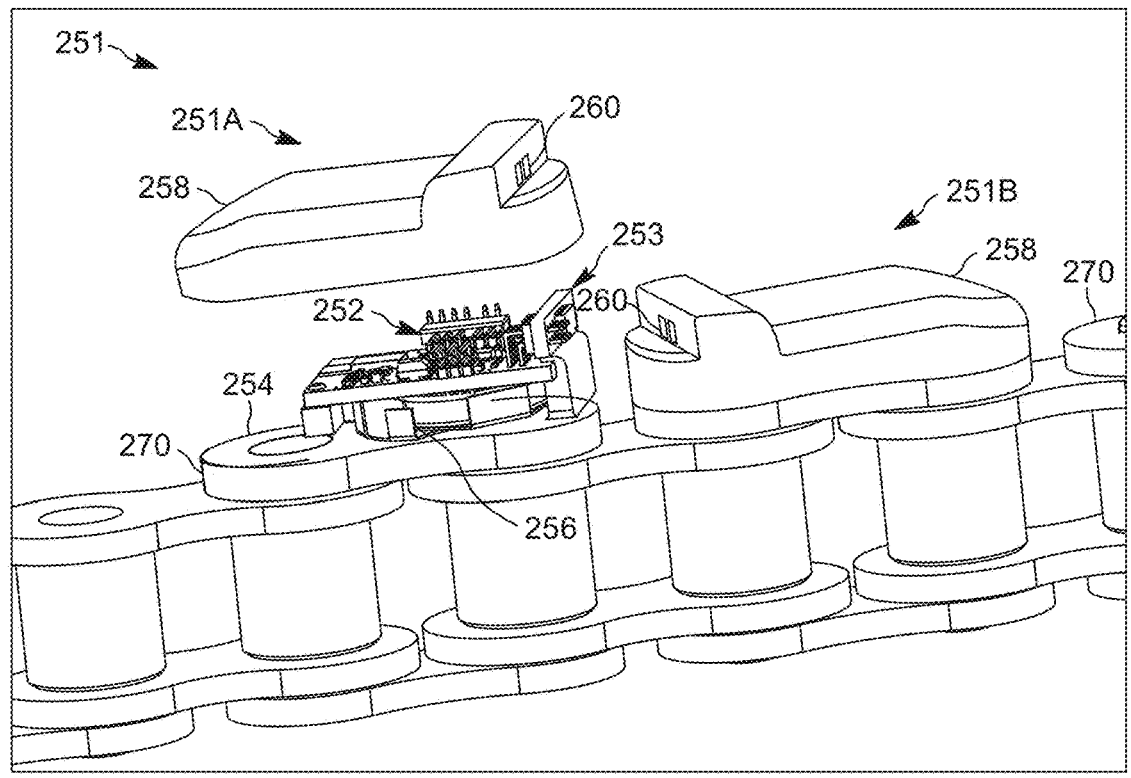
FIGS. 10A and 10B illustrate examples of an additional or alternative chain monitoring system mounted to a chain via plate, in accordance with aspects of this disclosure.

FIG. 10A illustrates an example of an additional or alternative chain monitoring system 251, employing a primary device 251A and target device 251B for determining wear and/or elongation of a chain. The systems may be mounted to a chain via an external plate 270. As shown, primary device 251A and target device 251B are identical or similar, with device 251A shown with internal components exposed and device 251B shown with cover 258 secured to mounting plate 254. In some examples, one or more of the systems include a sensor 250, controlled by one or more circuits and/or processing circuitry 252 (e.g., similar to control circuitry 26). An energy source 256 may be included, which may be removable and/or rechargeable, as disclosed herein.

The processing circuitry 252 of chain monitoring system of FIG. 10A may include a transceiver device 253 configured to generate, transmit and/or receive a signal (e.g., radar, LIDAR ("laser radar," or laser imaging, detection, and ranging), ultrasound, ultrasonic, an optical signal, an infrared signal, etc.) to or from an associated target (e.g., target device 251B, a second system, a reflective element, etc.) mounted on the chain. For instance, the target may be mounted on a section of chain a distance from the chain monitoring system 251 (e.g., the distance being on the order of millimeters to meters). A first distance (e.g., at manufacturing, installation, calibration, etc.) may be known and fixed relative to the number of plates 270 between the primary device 251A and target device 251B. For example, a calibration process may measure the distance between the sensor 250 and the target (e.g., at manufacture of the system, at installation of the chain, system, and/or target, before and/or after use of the chain, etc.).

Subsequent readings from the sensor 250 may be compared over time (e.g., to the initial calibrated distance value and/or intermediate distance measurements) to identify any change in the sensor 250 between the sensor 250 and the target. The measured changes at the sensor 250 (e.g., a phase shift, a change in signal strength, a change in response time, etc.) represent a change in distance between the sensor 250 and the target. The values and/or change in values may be processed (e.g., at the processing circuitry 252 or the remote device 52) to determine one or more characteristics of the chain (e.g., elongation, strain, temperature, amount of wear, remaining amount of service time, etc.). The determined characteristics may be used to alert a user of a need for service and/or command the connected device 54 to change and/or stop operation (in accordance with predetermined instructions).

As disclosed herein, chain wear percentage calculation/determination and/or reporting is executed by accurately measuring elongation of the chain over time as it wears through continued use. The device measures the distance between links and compares that to an original value (e.g., a baseline or calibrated distance) to determine wear elongation percentage. The baseline distance measurement can be taken via one or sensing modalities (e.g., light based sensor, magnetic field strength sensor, etc.), recording and analyzing changes relative to a pair of plates (and/or a device/sensor fixed to a plate and communicating with a fixed target). Those two items (e.g., devices on respective plates, relative to a target, etc.) gradually separate as the chain wears.

As shown in FIG. 10A, the systems and methods disclosed herein may additionally or alternatively employ a LIDAR, radar, optical, infrared, ultrasonic, or ultrasound sensor. Such a sensor may be affixed to the system 251, and a target is affixed to a downstream plate. The sensor 250 measures the distance and/or changes in the distance and evaluates, records, and/or transmits each measured value for comparison to a baseline value, yielding a wear percentage over time or other relevant chain characteristic.

In some examples, an ultrasonic sensor can be added and/or used as substitute for another sensor. For a given application, one or more technologies may be employed which offer benefits that could be balanced with another. Factors for consideration when adding and/or pairing sensing modalities include tolerance to contamination, tolerance to vibrations, operating environment, etc.

Figure 10B:
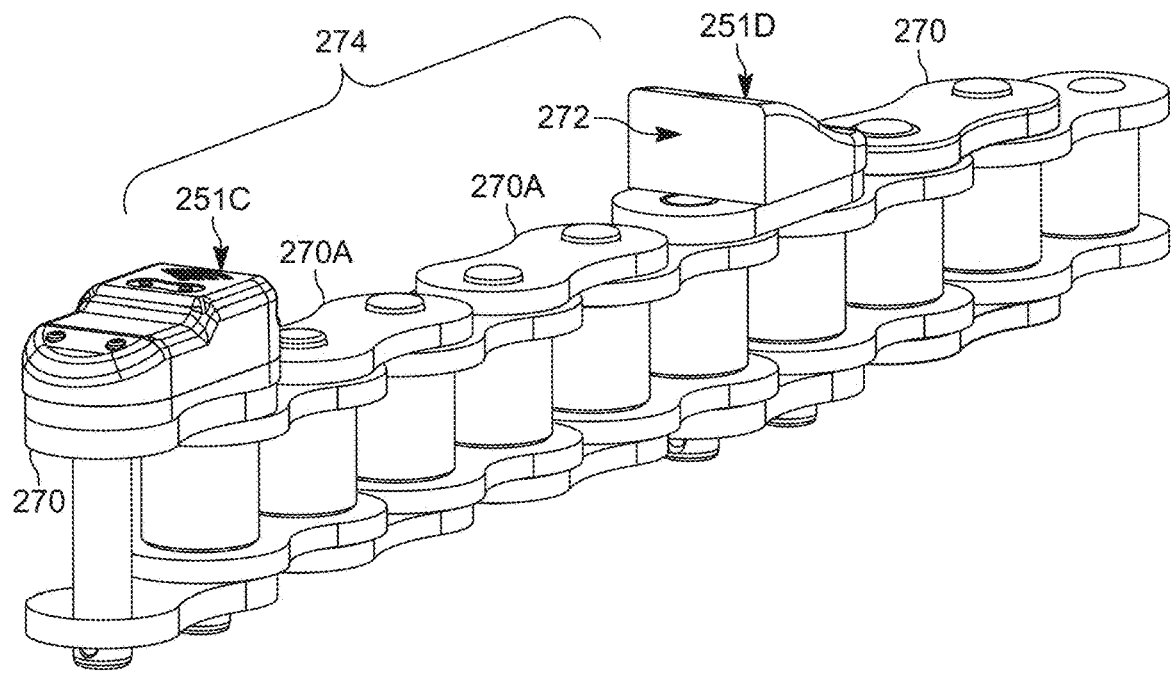

The measuring, transmission, receipt, and/or processing of data and measurements may be subjected to filters, averaging, and/or other compensation factors, such as mechanical and/or software applications. In some examples, the filtering may identify and/or predict disturbances in measurement and/or processing associated with vibrations or electromagnetic emissions from a motor drive and other electrical disturbances. Additionally or alternatively, measurements may be analyzed to identify particular events, and to record parameters associated with chain characteristics during such events (e.g., to record elongation at a time when the chain is experiencing the greatest load). FIG. 10B illustrates another example of an additional or alternative chain monitoring system 251 employing primary device 251C and target device 251D. In the example of FIG. 10B, the target 251D is affixed to a chain plate 270 a known distance 274 from the primary device 251C (e.g., separated by one or more intervening plates 270A), but aligned with and facing the transmission sensor (e.g., radar, LIDAR, ultrasound, ultrasonic, an optical sensor, an infrared sensor, etc.). In some examples, the target device 251D is not equipped with one or more of sensors, processing capabilities, energy storage, etc. In some examples, the target device 251D is equipped with a reflective surface 272, which can receive and/or reflect a signal from the primary device 251C. A feedback signal may be returned to the primary device 251C from the surface 272, which can be analyzed by the PCB 26 for changes in signal characteristics (e.g., phase shift, time of flight, signal strength, etc.) that can aid in a determination of changes in distance between the primary device 251C and target device 251D. In particular, as the chain wears, the distance between the primary device 251C and target device 251D increases. The change in distance 271 (e.g., as measured by sensors 48 and/or calculated based on sensor measurements) the PCB 26 can determine chain wear characteristics.

Figure 11A:
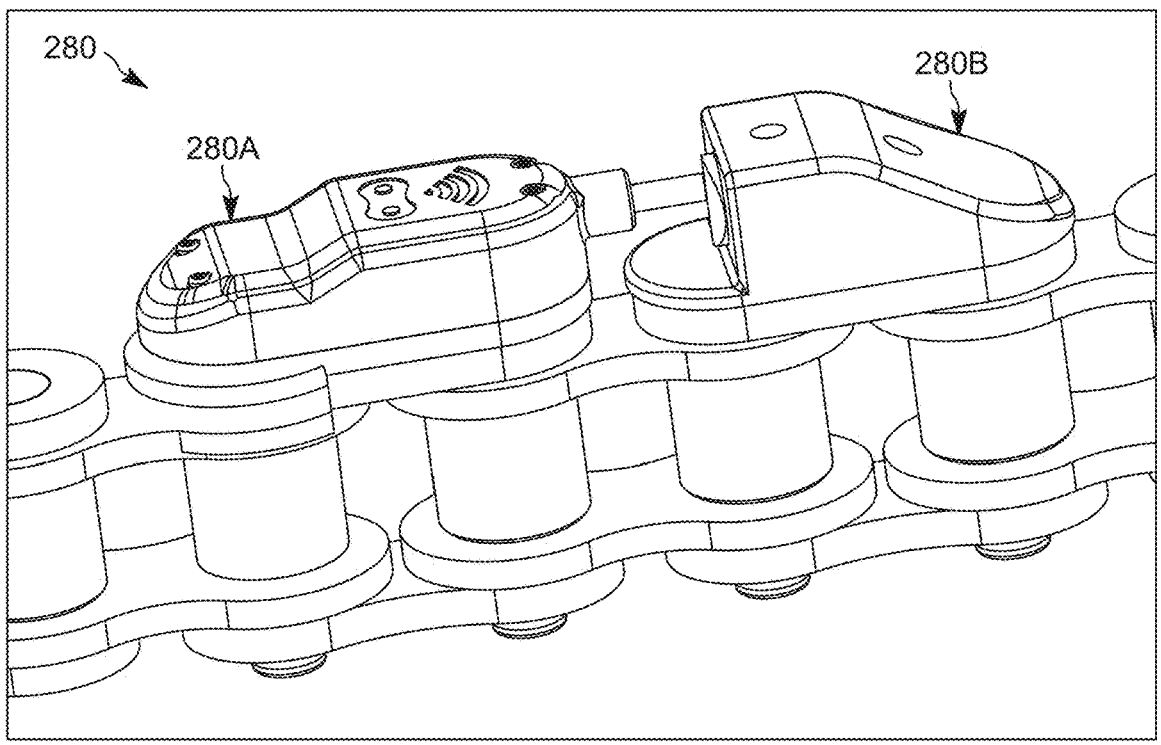
FIGS. 11A and 11B illustrate examples of an additional or alternative chain monitoring system mounted to a chain via plate, in accordance with aspects of this disclosure.
Figure 11B:
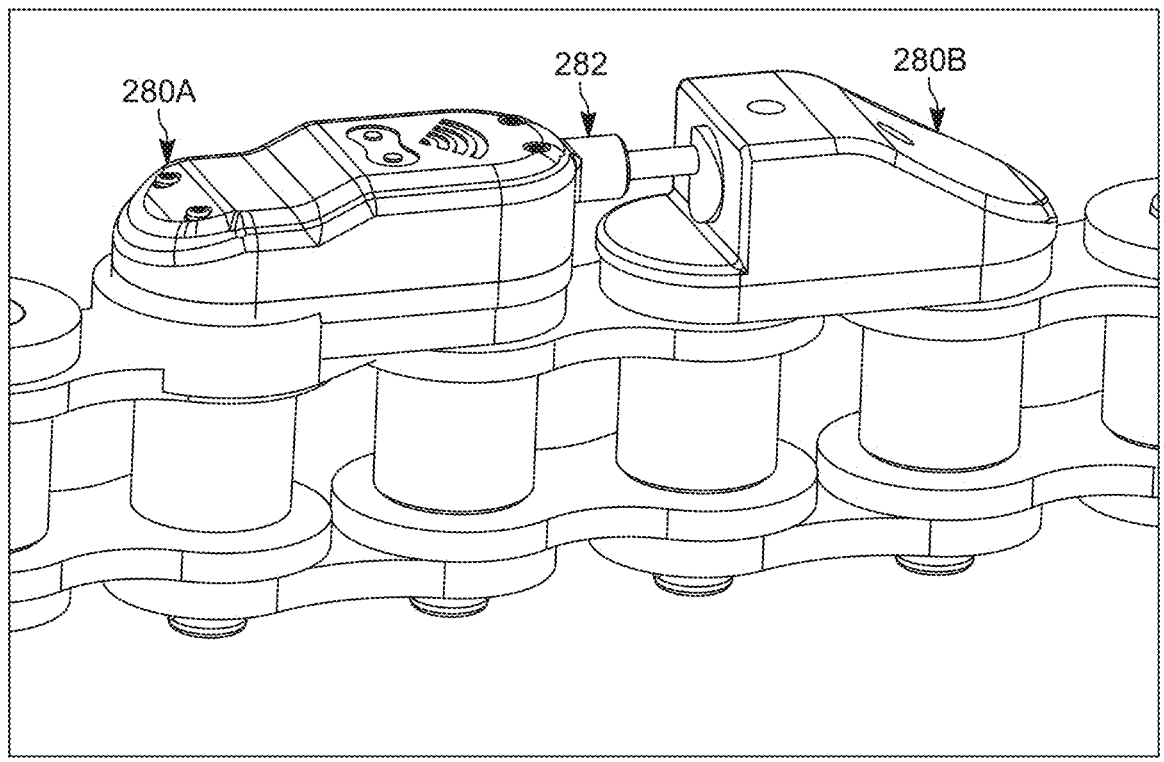

FIGS. 11A and 11B illustrate examples of an additional or alternative chain monitoring system 280 mounted to a chain via plate employing a close-proximity technique of ascertaining wear elongation, often as a percentage of wear capacity, life of the product, etc. As used herein, close proximity is defined as positioning a sensor device 280A and a target device 280B in close proximity to one another. As shown, the sensor device 280A is arranged on a first plate, with the target device 280B arranged on a second, adjacent plate. With this arrangement, one or more sensors (e.g., inductive, capacitive, magnetic such as hall sensors, etc.) may be employed, while limiting energy consumption and maximizing signal fidelity. For instance, as the magnetic field at the sensor changes, an output voltage from the sensor experiences a change (e.g., proportional to the change in the magnetic field—such as 1-5 mV per thousands of an inch change in distance). In some examples, the sensor device 280A and the target device 280B are both equipped with a PCB, similar to PCB 26, with a variety of sensors, circuits, and/or processing capabilities. In some examples, the target 280B has a limited number of features to preserve energy consumption and/or simplify a measurement event.

In the example of FIGS. 11A and 11B, the one or more sensors (e.g., sensors 48) detect changes in the distance between the sensor device 280A and the target device 280B at close range. For example, the sensor device 280A may be configured to generate a signal directed toward target 280B. A feedback signal is returned to the sensor device 280A, such that the sensor(s) measure values and/or changes in value of one or more signal characteristics (e.g., corresponding to an electrical, optical, and/or magnetic field) as the relative distance between the sensor device 280A and the target device 280B changes. In this way, this arrangement measures changes in distance between the respective host chain plates, and thereby enabling a wear elongation assessment as intended.

In some alternative or additional examples, adjacent and/or nearby devices may be physically linked. For instance, a string potentiometer (e.g., a tension sensor on a primary device linked to a target device on a nearby link).

In some examples, speed characteristics of the chain and/or system can be determined by measurement of the associated inertial measurement unit (IMU) and/or accelerometer. In one example implementation provided with respect to FIG. 12, a system 10 is mounted to a chain 30. The system 10 approaches a sprocket 13A (represented by the instance of the system 10A), which has a known diameter d. During operation, changes in acceleration are monitored (continuously or periodically), such that when a particular pattern of changes in acceleration are measured and/or calculated, the processing circuitry determines the system 10 is approaching the sprocket 13A (e.g., at the position of system 10A and in the direction 23) and/or exiting the sprocket 13 (e.g., at the position of system 10B and in the direction 25). In some examples, if the change in acceleration is maintained for a predetermined amount of time and/or for a predetermined number of sampling periods (e.g., based on a size of the sprocket 13A), the processing circuitry determines the system has entered and/or exited the sprocket 13A.

Upon entrance to the sprocket 13A (e.g., at 23, identified by a first predetermined change in acceleration) a timing device (e.g., clock 51 at the PCB 26) is activated. As the system 10A exits the sprocket 13 (e.g., at 25, identified by a second predetermined change in acceleration) the timing device is stopped. The elapsed time is calculated by the following equation $$\text{Speed} = \frac{\pi r}{t}$$

Where r is the radius of the sprocket 13A and t is the time elapsed during activation of the timing device. Thus, the speed of the chain 30 traversing the sprocket 13A can be calculated.

Figure 12:
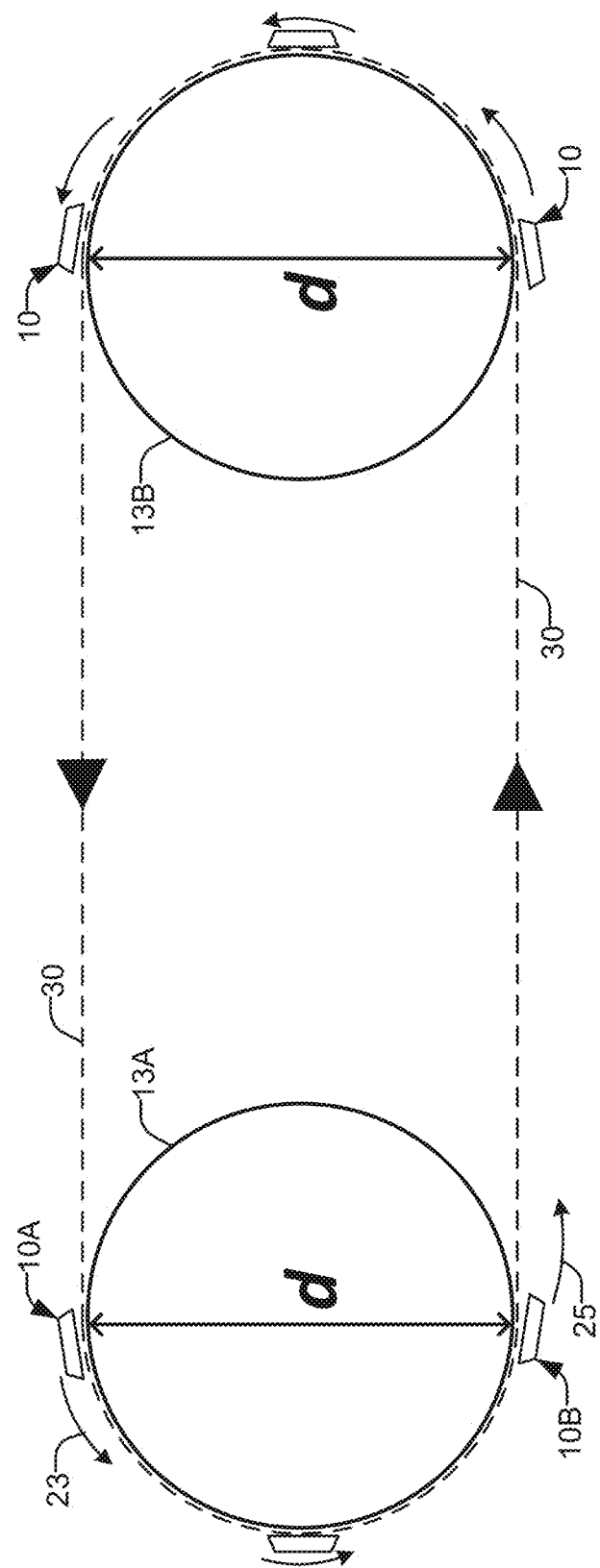
FIG. 12 illustrates an example chain monitoring system for determining speed characteristics of a chain and/or the system, in accordance with aspects of this disclosure.

In an additional or alternative example, the system 10A is configured to sense changes in direction (e.g., due to a change in one or more force vectors, as provided by an IMU/accelerometer), associated with a specific force vector(s) representing a predetermined location along the chain path. As shown in FIG. 12, system 10A transitions from a linear portion of the chain path to the downward arc 23 corresponding to diameter d of sprocket 13A. Having measured and recognized the specific force vector(s) associated with movement about sprocket 13A, the timing device is activated.

In some examples, the timing device remains active until the measured specific force vector(s) corresponding to the position/movement associated with the system 10A are recognized. In response, a time value associated with the elapsed time is stored in memory and/or transmitted to a control circuitry (and the timing device may be deactivated). The processor may employ the time value to determine a speed of the chain, such as by accessing information relating to chain length.

In the example of FIG. 12, one or more of the sprockets may drive the chain, which may result in variations in the specific force vectors, speed, etc. of the system 10 entering/exiting rotation about the sprockets. As shown, sprocket 13A drives the chain, providing tight side traverse of the chain at a top portion, with loose chain returning along the bottom from the drive sprocket 13A to driven sprocket 13B. The specific force vectors associated with given location along the chain path may be determined and/or stored (for reference), such that the time value and/or speed may be calculated/determined based on a variety of start/stop locations along the chain path.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims, both literally and under the doctrine of equivalents.

What is claimed is:

1. A chain monitoring system comprising:
   a primary device mounted on a first plate of a chain and having a first device configured to generate, transmit, or receive a signal;
   a secondary device mounted on a second plate of the chain and having a surface to reflect the signal toward the first device; and
   one or more sensors integrated with the primary device, the one or more sensors to measure one or more parameters relative to a distance between the primary and secondary devices, wherein a value or change in value of the one or more parameters corresponds to a characteristic of the chain.

2. The chain monitoring system of claim 1, wherein the signal is one of an electromagnetic signal or an ultrasonic signal.

3. The chain monitoring system of claim 1, wherein the primary device comprises a magnetic sensor and the secondary device comprises a permanent magnet, the one or more sensors configured to measure a magnetic field strength or a change in magnetic field strength between the primary and secondary devices.

4. The chain monitoring system of claim 1, wherein the one or more sensors is a thermistor, a strain gauge, an inertial measurement unit, a LIDAR sensor, a radar sensor, an ultrasonic sensor, an optical sensor, an infrared sensor, a string potentiometer, or a magnetic sensor.

5. The chain monitoring system of claim 4, wherein the one or more parameters include a magnetic field, an optical signal, a temperature, time in service, speed, shock, or load of the chain.

6. The chain monitoring system of claim 1, further comprising processing circuitry to:
   receive measurements from the one or more sensors;
   compare the measurements to one or more corresponding threshold values;
   calculate a wear value of the chain based on the measurements comparison;
   compare the wear value to a list of wear statuses; and
   determine a wear status of the chain based on the wear value comparison, and present the wear status on a user interface.

7. The chain monitoring system of claim 6, wherein the processing circuitry is further configured to:
   identify measurements that exceed the one or more corresponding threshold values within a predetermined interval;
   apply a filter to the identified measurements;
   determine whether an identified measurement lies outside a range of acceptable averaging values; and
   generate an alert corresponding to each identified measurement that remains following application of the filter.

8. The chain monitoring system of claim 6, wherein the processing circuitry is further configured to:
   receive measurements from the one or more sensors;
   calculate a change or a rate of change of one or more variables measured by the one or more sensors;
   determine a change in the calculated change or rate of change of the variables; and
   provide an indication of the change in the system on a user interface, the indication including actionable alerts.

9. The chain monitoring system of claim 7, wherein the filter is an averaging function applied over the predetermined interval or a plurality of predetermined intervals.

10. A chain monitoring system comprises:
    an enclosure to contain one or more components including a permanent magnet, a surface of the enclosure to mate with a link to mount the system onto a chain;
    one or more magnetic sensors to measure one or more parameters corresponding to chain elongation, wherein the one or more magnetic sensors are configured to measure a magnetic field strength or a change in magnetic field strength between the permanent magnet and the one or more magnetic sensors; and a processing circuitry to:
receive measurements from the one or more magnetic sensors;
determine an elongation value of the chain based on the received measurements; and
transmit the elongation value to a remote computing platform for analysis, display, or control.

11. The chain monitoring system of claim 10, wherein the processing circuitry is further configured to:
determine a maximum threshold elongation value;
calculate a threshold operating elongation value below the maximum threshold value;
compare the elongation value to the threshold operating elongation value; and
generate an alert in response to the elongation value exceeding the threshold operating elongation value.

12. The chain monitoring system of claim 10, wherein the processing circuitry is further configured to:
receive measurements from the one or more magnetic sensors;
calculate a change or a rate of change of one or more variables measured by the one or more magnetic sensors, wherein the variables correspond to one or more of temperature, speed, location, force, movement, shock load, wear, elongation, or time;
compare the calculated change or rate of change to a list of threshold changes or rates of change of the one or more variables; and
generate an alert in response to the calculated change or rate of change violating a threshold of the list of threshold changes or rates of change.

13. The chain monitoring system of claim 11, wherein the processing circuitry is further configured to assign a weighted factor to one or more of the measurements from the one or more magnetic sensors before or after the measurements comparison.

14. The chain monitoring system of claim 11, further comprising an alert indicator configured to illuminate when a measured parameter exceeds a threshold value.

15. A chain monitoring system comprises:
an enclosure to contain one or more components, a surface of the enclosure to mate with a link to mount the system onto a chain;
a magnetic sensor to measure a magnetic field from a magnetic source, wherein the magnetic source is arranged on a first plate of the chain and the magnetic sensor is arranged on a second plate of the chain adjacent to the first plate; and
a processing circuitry to:
receive magnetic field measurements from the magnetic sensor;
determine an elongation value of the chain based on the received magnetic field measurements; and
transmit the elongation value to a remote system for analysis, display, or control.

16. The chain monitoring system of claim 15, wherein the processing circuitry is further configured to:
determine an elongation status for the chain, including a maximum threshold value;
calculate a threshold operating elongation value below the maximum threshold value;
compare the elongation value to the threshold operating value; and
generate an alert in response to the elongation value exceeding the threshold operating elongation value.

* * * * *